US012780349B2

(12) United States Patent
Hahn et al.

(10) Patent No.: US 12,780,349 B2
(45) Date of Patent: Nov. 3, 2026

(54) TORQUE SENSOR FOR AN EBIKE SYSTEM

(71) Applicant: SRAM, LLC, Chicago, IL (US)

(72) Inventors: Sage Hahn, Chicago, IL (US); Sebastian Heyna, Dittelbrunn (DE); Henrik Braedt, Dittelbrunn (DE); William Barrett Lee, Kirchlauter (DE)

(73) Assignee: SRAM, LLC, Chicago, IL (US)

( * ) Notice: Subject to any disclaimer, the term of this patent is extended or adjusted under 35 U.S.C. 154(b) by 654 days.

(21) Appl. No.: 18/073,775

(22) Filed: Dec. 2, 2022

(65) Prior Publication Data

US 2023/0174194 A1 Jun. 8, 2023

Related U.S. Application Data

(60) Provisional application No. 63/286,370, filed on Dec. 6, 2021.

(51) Int. Cl.

| | |
|---|---|
| ***B62M 6/50*** | (2010.01) |
| ***B62J 45/411*** | (2020.01) |
| *B62M 6/55* | (2010.01) |
| *G01L 3/10* | (2006.01) |

(52) U.S. Cl.

CPC .............. *B62M 6/50* (2013.01); *B62J 45/411* (2020.02); *B62M 6/55* (2013.01); *G01L 3/105* (2013.01)

(58) Field of Classification Search

CPC . B62M 6/50; B62M 6/55; B62J 45/411; B62J 45/421; G01L 3/105; G01L 3/102

See application file for complete search history.

(56) References Cited

U.S. PATENT DOCUMENTS

| | | | | |
|---|---|---|---|---|
| 4,989,460 | A | 2/1991 | Mizuno et al. | |
| 5,442,966 | A | 8/1995 | Hase | |
| 7,355,501 | B2 * | 4/2008 | Buhler | G01D 5/2053 336/200 |
| 8,746,081 | B2 | 6/2014 | Sasaki | |
| 8,807,260 | B2 * | 8/2014 | Shimizu | B62J 45/421 180/220 |
| 9,587,997 | B2 * | 3/2017 | Fujita | G01L 5/221 |
| 9,995,349 | B2 * | 6/2018 | Fujiwara | F16C 41/001 |
| 10,418,541 | B2 * | 9/2019 | Matsumoto | G01L 3/103 |
| 10,591,371 | B2 * | 3/2020 | D'Elia | B62J 45/20 |
| 11,079,291 | B2 * | 8/2021 | Bertin | G01L 3/105 |
| 2006/0152320 | A1 | 7/2006 | Buhler | |
| 2013/0133969 | A1 | 5/2013 | Yasuo | |

(Continued)

FOREIGN PATENT DOCUMENTS

| | | |
|---|---|---|
| CN | 101329209 | 12/2008 |
| CN | 101960274 | 1/2011 |

(Continued)

*Primary Examiner* — Freddie Kirkland, III

(57) ABSTRACT

A torque sensor for a bicycle includes a coil. The torque sensor may include a support that is disposable around a device of the bicycle, such that the support and the device of the bicycle are separated by an air gap. The torque sensor may also include an excitation coil supported by the support, and a sense coil supported by the support at a distance away from the excitation coil in an axial direction of the support. The excitation coil is configured to induce a voltage and/or current in the sense coil via the device of the bicycle when the support is disposed around the device of the bicycle. The induced voltage is related to a torque in the device.

21 Claims, 33 Drawing Sheets

(56) References Cited

U.S. PATENT DOCUMENTS

| | | | | |
|---|---|---|---|---|
| 2016/0195145 | A1 | 7/2016 | Fujiwara | |
| 2016/0273981 | A1 | 9/2016 | Fujita | |
| 2018/0226565 | A1 | 8/2018 | Hiroshi | |
| 2021/0255049 | A1 * | 8/2021 | Ettenauer | G01L 9/16 |

FOREIGN PATENT DOCUMENTS

| | | | |
|---|---|---|---|
| CN | 109178186 | | 1/2019 |
| CN | 210268977 | U | 4/2020 |
| EP | 0765804 | | 4/1997 |
| EP | 3696070 | | 8/2020 |
| EP | 3572237 | | 8/2021 |
| JP | H10250673 | | 9/1998 |
| JP | 2002082000 | | 3/2002 |
| JP | 4612061 | | 1/2011 |
| JP | 5128914 | | 1/2013 |
| WO | 2012/023386 | | 2/2012 |

* cited by examiner

SECTION Z-Z

SECTION Y-Y

TORQUE SENSOR FOR AN EBIKE SYSTEM

This application claims the benefit of U.S. Provisional Patent Application No. 63/286,370, filed Dec. 6, 2021, which is hereby incorporated by reference in its entirety.

BACKGROUND

1. Field of the Disclosure

The present disclosure is generally directed to a sensor for a bicycle, and more particularly, to a torque sensor for an electric bicycle.

2. Description of Related Art

A bicycle with a pedal assist electric motor (e.g., an electric bicycle or an ebike) may include sensors that monitor parameters at the bicycle. The monitored parameters may include, for example, input torque at a crank arm assembly of the bicycle.

Sensors that monitor the input torque at the crank arm assembly of the bicycle include, for example, strain gauges. Strain gauges are, however, expensive, may be incompatible with concentric motors, and do not allow for contactless sensing.

SUMMARY

In one example, a torque sensor for a bicycle includes a support that is disposable around a device of the bicycle, such that the support and the device of the bicycle are separated by an air gap. The torque sensor also includes an excitation coil supported by the support, and a sense coil supported by the support at a distance away from the excitation coil in an axial direction of the support. The excitation coil is configured to induce a voltage in the sense coil via the device of the bicycle when the support is disposed around the device of the bicycle. The induced voltage is related to a torque in the device.

In one example, the torque sensor further includes a shield that covers the excitation coil and the sense coil, such that the excitation coil and the sense coil are enclosed within the torque sensor.

In one example, the shield is a first shield. The torque sensor further includes a second shield. The second shield at least partially covers the first shield.

In one example, the bicycle is an electric bicycle, and the device of the bicycle is a clutch mechanism of the electric bicycle. The support is a hollow cylinder disposable around part of the clutch mechanism of the electric bicycle.

In one example, the support includes a first groove and a second groove that extend circumferentially around an outer side of the support. The second groove is offset relative to the first groove along the axial direction of the support. The excitation coil is disposed within the first groove, and the sense coil is disposed within the second groove.

In one example, the sense coil is a first sense coil, and the axial direction is a first axial direction. The support further includes a third groove that extends circumferentially around the outer side of the support. The third groove is offset relative to the first groove along a second axial direction of the support. The second axial direction is opposite the first axial direction of the support. The torque sensor further includes a second sense coil disposed around and supported by the support. The second sense coil is disposed within the third groove.

In one example, the excitation coil is a first excitation coil. The support further includes a fourth groove that extends circumferentially around the outer side of the support. The fourth groove is offset relative to the first groove along the first axial direction or the second axial direction. The torque sensor further includes a second excitation coil disposed around and supported by the support. The second excitation coil is disposed within the fourth groove.

In one example, the first excitation coil and the first sense coil form a first magnetic circuit, and the second excitation coil and the second sense coil form a second magnetic circuit. The support has a first part that houses the first magnetic circuit, and a second part that houses the second magnetic circuit. The torque sensor further includes a shield that separates the first part of the support and the second part of the support, such that the first magnetic circuit and the second magnetic circuit are separated. The shield covers at least part of the support.

In one example, the shield covers at least the first groove, the second groove, the third groove, and the fourth groove. The shield is made of a ferrite.

In one example, the shield is a first shield. The torque sensor further includes a second shield that at least partially covers the first shield. The second shield is made of a non-ferromagnetic, electrically conductive material.

In one example, the support is formed by a plurality of stacked printed circuit boards (PCBs). The excitation coil is formed on, in, or on and in a first printed circuit board (PCB) of the plurality of stacked PCBs, and the sense coil is formed on, in, or on and in a second PCB of the plurality of stacked PCBs.

In one example, a clutch mechanism for an electric bicycle includes an inner race, an outer race positioned around the inner race, and a torque sensor positioned around a race of the inner race and the outer race, such that the torque sensor and the race are separated by an air gap. The torque sensor is configured to measure a torque within the clutch mechanism. The torque sensor includes a housing that is disposable around the race. The torque sensor also includes an excitation coil disposed around and supported by the housing, a first sense coil disposed around and supported by the housing at a first distance away from the excitation coil in a first axial direction of the housing, and a second sense coil disposed around and supported by the housing at a second distance away from the excitation coil in a second axial direction of the housing. The second axial direction of the housing is opposite the first axial direction of the housing. The excitation coil is configured to induce a voltage in the first sense coil via the race. The induced voltage is related to a torque in the clutch mechanism.

In one example, the race is the outer race, and the outer race is a shaft of a chainring of the electric bicycle.

In one example, the excitation coil is a first excitation coil. The torque sensor further includes a second excitation coil disposed around and supported by the housing. The second excitation coil is offset relative to the first excitation coil in the second axial direction.

In one example, the housing includes a first groove, a second groove, a third groove, and a fourth groove that extend circumferentially around an outer side of the housing. The first groove, the second groove, the third groove, and the fourth groove are offset relative to each other along the first axial direction of the housing. The first excitation coil is disposed within the first groove, the first sense coil is disposed within the second groove, the second sense coil is disposed within the third groove, and the second excitation coil is disposed within the fourth groove.

In one example, the torque sensor further includes a shield that separates the first excitation coil and the first sense coil from the second sense coil and the second excitation coil, and covers the first groove, the second groove, the third groove, and the fourth groove.

In one example, the shield is a first shield and is made of a first material. The torque sensor further includes a second shield. The second shield partially covers the first shield and is made of a second material. The second material is different than the first material.

In one example, the voltage is a first voltage. The second excitation coil is configured to induce a second voltage in the second sense coil via the race. The clutch mechanism further includes a processor configured to determine the torque in the clutch mechanism based on the induced first volage and the induced second voltage.

In one example, the processor is further configured to determine a difference between the induced first voltage and the induced second voltage. The processor being configured to determine the torque in the clutch mechanism based on the induced first voltage and the induced second voltage comprises the processor being configured to determine the torque in the clutch mechanism based on determined difference between the induced first voltage and the induced second voltage.

In one example, a torque sensor for a bicycle includes a support that is disposable around a clutch mechanism of the bicycle. The support has a first part and a second part. The torque sensor also includes a first magnetic circuit supported by and disposed around the first part of the support. The first magnetic circuit includes a first excitation coil and a first sense coil. The first excitation coil and the first sense coil are offset relative to each other in an axial direction of the support. The torque sensor also includes a second magnetic circuit supported by and disposed around the second part of the support. The second magnetic circuit includes a second excitation coil and a second sense coil. The second excitation coil and the second sense coil are offset relative to each other in the axial direction of the support. The torque sensor also includes a first shield that separates the first part of the support and the second part of the support, such that the first magnetic circuit and the second magnetic circuit are separated. The first shield covers at least the first excitation coil, the first sense coil, the second excitation coil, and the second sense coil. The torque sensor also includes a second shield that covers at least part of the first shield. The first excitation coil is configured to induce a first voltage in the first sense coil via part of the clutch mechanism when the support is disposed around the clutch mechanism, and the second excitation coil is configured to induce a second voltage in the second sense coil via the part of the clutch mechanism when the support is disposed around the clutch mechanism. A torque in the clutch mechanism is determinable based on the induced first voltage and the induced second voltage.

In one example, a torque sensor for a bicycle is provided. The torque sensor includes a coil. The coil is disposed circumferentially around the entirety of a device of the bicycle. The coil is configured to sense a current and/or voltage related to a torque in the device. The torque sensor may also include a support that is disposable around or near the device of the bicycle. The coil may be supported by the support. The device may be a clutch of a drive unit of the bike. The coil may be disposed circumferentially around a race of the clutch.

BRIEF DESCRIPTION OF THE DRAWINGS

Objects, features, and advantages of the present invention will become apparent upon reading the following description in conjunction with the drawing figures, in which.

Other aspects and advantages of the embodiments disclosed herein will become apparent upon consideration of the following detailed description, wherein similar or identical structures have similar reference numerals.

DETAILED DESCRIPTION OF THE DISCLOSURE

Figure 1:
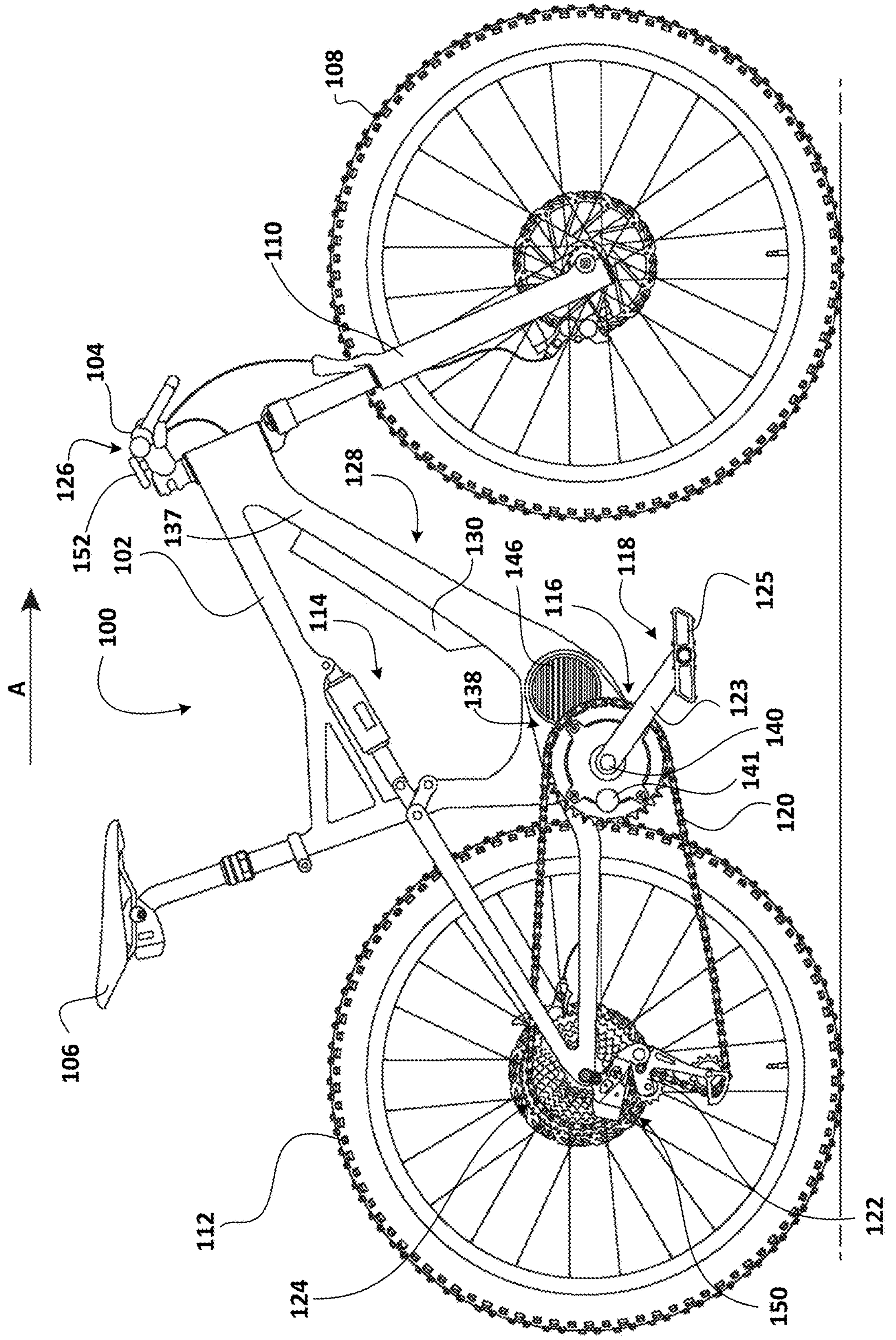
FIG. 1 is a side view of one example of an electric bicycle that includes a torque sensor in accordance with the teachings of this disclosure.

A bicycle with an electric pedal assist motor capable of driving a chainring independent of cranks (e.g., an ebike) is provided. Accurate, robust, and cost-effective torque sensing is to be provided for control of the ebike. For proportional control of the electric pedal assist motor, a controller of the bicycle may change an electric assist provided by the assist motor based on an amount of input torque generated by a rider at a crank assembly of the bicycle. For example, as sensed input torque increases, the controller increases the electric assist provided by the assist motor, and as the sensed input torque decreases, the controller decreases the electric assist provided by the assist motor.

For bicycle transmissions that utilize electronic shifting, as cadence increases, a controller running an automatic shifting algorithm initiates a gear shift. A rider of the bicycle may, however, prefer to pedal at a lower cadence when riding at a leisurely pace and may prefer to pedal at a higher cadence when riding aggressively. Automatic cadence band adjustment may be provided based on a sensed riding scenario. For example, the controller may increase a target cadence, and thus a target cadence band, for the automatic shifting when high input torque is sensed and decrease the target cadence and the target cadence band for the automatic shifting when low input torque is sensed.

A torque sensor according to the present disclosure may be incorporated within a roller bearing or sprag type rotary clutch mechanism of an ebike system. For example, a sprag type rotary clutch mechanism may be disposed between a crank input (e.g., a crank axle) and a chainring output and/or a motor input of the ebike system. The sprag type rotary clutch mechanism transmits torque in a first rotational direction but rotates freely in a second rotational direction that is opposite the first rotational direction. For example, the crank input drives, via the sprag type rotary clutch mechanism, the chainring output in the first rotational direction but freely rotates in the second rotational direction. When an assist motor of the ebike system drives the chainring output, such that the chainring output rotates faster than the crank input (e.g., pedaling by a rider of the bicycle), the sprag type rotary clutch mechanism slips or is overrun.

The sprag type rotary clutch mechanism, for example, generates high strain in a hoop section of an outer race (e.g., part of the chainring output) of the clutch mechanism proportional to reacted torque. The torque sensor of the present disclosure may measure the strain in the hoop section of the outer race by incorporating the outer race into a magnetic path of an electric transformer, and making the outer race out of a material (e.g., an alloy) that has linear or predictable magnetostrictive properties. Such materials have a magnetic permeability that changes with applied strain.

The torque sensor includes the transformer, which has at least one excitation coil and at least one sense coil. The at least one excitation coil is energized by an alternating current (AC) voltage that induces an AC voltage in the at least one sense coil. The at least one excitation coil and the at least one sense coil are disposed around the outer race (e.g., the part of the chainring output), such that a magnitude of the AC voltage induced in the at least one sense coil is related to a torque reacted in the sprag type rotary clutch mechanism, for example.

Various embodiments of the invention will be described herein with reference to the drawings. It will be understood that the drawings and the description set out herein are provided for illustration only and do not limit the invention as defined by the claims appended hereto and any and all their equivalents. For example, the terms “first” and “second”, “front” and “rear”, “left” and “right” are used for the sake of clarity and not as terms of limitation. Moreover, the terms refer to bicycle mechanisms conventionally mounted to a bicycle and with the bicycle orientated and used in a standard fashion unless otherwise indicated.

It is to be understood that the specific arrangement and illustrated components of the frame, front wheel, rear wheel, drivetrain, front brake, rear brake, and saddle are non-limiting to the disclosed embodiments. For example, while the front brake and the rear brake are illustrated as hydraulic disc brakes, hydraulic rim brakes are contemplated and encompassed within the scope of the disclosure. Additionally, mechanical systems including mechanical rim brakes and mechanical disk brakes, as well as other electronic, hydraulic, pneumatic, and mechanical systems, or combinations thereof, such as suspension systems, are contemplated and encompassed within the scope of the present disclosure.

Turning now to the drawings, FIG. 1 generally illustrates a bicycle 100 with which one or more system control devices 150 may be used to implement a bicycle control system using the torque sensor described herein. In this example, the bicycle 100 may be a mountain bicycle. In some cases, the bicycle 100 may be an e-bike. The bicycle 100 has a frame 102, a handlebar 104 near a front end of the frame 102, and a seat or saddle 106 for supporting a rider over a top of the frame 102. The bicycle 100 also has a first or front wheel 108 carried by a front fork 110 of the frame 102 and supporting the front end of the frame 102. The bicycle 100 also has a second or rear wheel 112 supporting a rear end of the frame 102. The rear end of the frame 102 may be connected to a rear suspension component 114. The bicycle 100 also has a drive train 116 with a crank assembly 118 that is operatively coupled via a chain 120 and a rear derailleur 122 to a rear cassette 124 near a rotation axis of the rear wheel 112. The crank assembly 118 includes two cranks 123 and two pedals 125 connected to the two cranks 123, respectively, on opposite sides of the frame 102 of the bicycle 100.

In the example shown, the rear derailleur 122 includes a power source (e.g., a battery) and a motor, and receives instructions (e.g., wirelessly) from a controller 126 (e.g., a shifter or a central controller) mounted, for example, to the handlebar 104 or the frame 102 to shift gears on the rear cassette 124. In one embodiment, the rear derailleur 122 receives instructions from an e-bike control system 128 (e.g., including one or more processors, control circuitry, and/or a power source 130; a system control device 150) to shift gears on the rear cassette 124. The rear derailleur 122 shifts gears using, for example, the power source and the motor of the rear derailleur 122, based on the received instructions.

In one embodiment, the rear derailleur 122 is powered by a power source outside of the rear derailleur 122. For example, the rear derailleur 122 is powered by the power source 130 (e.g., a battery) of the e-bike control system 128. In another embodiment, the rear derailleur 122 is also connected to an input on the handlebar 104 (e.g., a shifter), for example, via a shifter cable and shifts gears on the rear cassette 124 based on movement of the shifter (e.g., by the rider), and thus the shifter cable.

The battery 130 of the e-bike control system 128 is also supported by the frame 102 of the bicycle 100. For example, the battery 130 of the e-bike control system 128 is supported by a bottom tube 137 of the frame 102 of the bicycle 100. One or more components (e.g., the controller 126) of the bicycle 100 may be coupled with the power source 130 of the e-bike control system 128 via other wires, respectively.

The battery 130, for example, powers a drive unit 138 (e.g., including an e-bike motor) that is operatively coupled to the crank assembly 118. In one embodiment, the drive unit 138 may also be powered by a separate battery to provide access to e-bike controls when the battery 130 of the e-bike control system 128 is not attached to the bicycle 100.

The drive unit 138 is mounted to the frame 102 of the bicycle 100. For example, the drive unit 138 is mounted to the frame 102 of the bicycle 100 with one or more bolts and threaded openings within the frame 102 of the bicycle 100. The drive unit 138 may be attached to the frame 102 in other ways. A crank axle 140 (e.g., a crank shaft) runs through an opening through the drive unit 138 and connects the two cranks 123 of the crank assembly 118. During operation, the rider rotates the two cranks 123 via the two pedals 125, rotating the crank axle 140. The crank assembly 118 and/or the drive unit 138 may include sensors 141 configured to measure axle rotation and forces on the crank axle 140. At least some of the sensors 141 may, for example, be disposed on, adjacent to, and/or within the crank axle 140 and/or at least one of the two cranks 123. The crank axle 140 drives an output ring (e.g., a chainring shaft) of the drive unit 138 in a forward drive direction but not in a back pedaling direction through the use of, for example, a one-way clutch (e.g., a sprag type rotary clutch mechanism) between the crank axle 140 and the output ring.

The measured axle rotation and the measured forces on the crank axle 140 (e.g., by the sensors) may be used to control an electric drive motor 146 (e.g., an assist motor) of the drive unit 138. The assist motor 146 may directly or through the use of gears also drive rotation of the output ring. The output ring thus provides an output power to the drive train 116 that is a combination of rider input power and an output power of the assist motor 146.

While the bicycle 100 depicted in FIG. 1 is a mountain bicycle and may include suspension components, such as a shock absorbing front fork, the specific embodiments and examples disclosed herein as well as alternative embodiments and examples may be implemented on other types of bicycles. For example, the disclosed torque sensors may be used on road bicycles, as well as bicycles with mechanical (e.g., cable, hydraulic, pneumatic, etc.) and non-mechanical (e.g., wired, wireless) drive systems. For example, the illustrated handlebar 104 involves an aero-bar configuration; however, the controller 126 and/or bicycle control system may be used with other types of handlebar assemblies as well, such as drop bars, bullhorn bars, riser bars, or any other type of bicycle handlebar. For example, the controller 126 may be a lever integrated with a drop bar configuration. Also, while the embodiments described herein describe manual control devices attached to handlebars, a person having experience in the art would recognize the possible positioning of control devices at other areas of a bicycle, such as locations throughout the frame 102 or other locations. The disclosed bicycle shifting control methods may also be implemented on other types of two-, three-, and four-wheeled human powered vehicles as well.

The front and/or forward orientation of the bicycle 100 is indicated by the direction of the arrow "A" in FIG. 1. As such, a forward direction of movement of the bicycle 100 is indicated by the direction of the arrow A.

The drive unit 138 may include internal electronics to control operation of the assist motor 146, measure axle inputs, measure an inclination of the bicycle 100, measure an acceleration of the bicycle 100, measure a temperature of the bicycle 100, and/or reduce a voltage of the battery 130 of the e-bike control system 128 to accommodate and power external devices if lower voltages are required. For example, the internal electronics of the drive unit 138 may include one or more of the sensors 141 (e.g., one or more torque sensors, power meters, cadence sensors, wheel speed sensors, speed sensors, GPS sensors, inclination sensors, direction sensors, seat pressure sensors, mechanical switches, pedal force sensors, accelerometers, gyroscopes, lidar sensors, and/or other sensors). Additional, fewer, and/or different internal electronics may be provided within the drive unit 138. At least one of the sensors 141 may alternatively or additionally be located elsewhere on or in the bicycle 100 (e.g., an accelerometer on or in the rear suspension component 114).

A controller of the drive unit 138 (e.g., an e-bike central control system or controller; a system control device 150) may be disposed on a housing of the drive unit 138 and wired to the internal electronics of the drive unit 138. Alternatively or additionally (e.g., as part of a same housing), the e-bike controller may be supported by a same housing as the power source 130. The e-bike controller may be made of a material through which wireless control signals may pass. In one embodiment, the e-bike controller is wired to the e-bike control system 128.

The e-bike controller may control power from the power source 130 to components on the bicycle 100 such as, for example, the electric drive motor 146 of the drive unit 138. The e-bike controller may control power to other and/or different components on the bicycle 100. The e-bike controller may send signals (e.g., instructions) to and/or receive data (e.g., instructions and/or sensor data) from components on the bicycle 100 such as, for example, the rear derailleur 122, a suspension system, and/or a seat post assembly to actuate and/or control components of the bicycle 100.

In other embodiments, the e-bike controller may be located in other locations (e.g., mounted on the handlebar 104) on the bicycle 100 or, alternatively, may be distributed among various components of the bicycle 100, with routing of a communication link to accommodate necessary signal and power paths. For example, a control unit 152 (e.g., acting as the e-bike controller; a system control device 150) may be mounted to the handlebar 104 for actuating a motor of the rear derailleur 122 and operating the rear derailleur 122 for executing gear changes and gear selection. The control unit 152 and/or the e-bike controller, however, may be located anywhere on the bicycle 100 or, alternatively, may be distributed among various components of the bicycle 100, with routing of a communication link to accommodate necessary signal and power paths. In one example, the e-bike controller may be integrated with the rear derailleur 122 to communicate control commands between components. The control unit 152 and/or the e-bike controller may also be located other than on the bicycle 100, such as, for example, on a rider's wrist or in a jersey pocket. The communication link may include wires, may be wireless, or may be a combination thereof. The control unit 152 and/or the e-bike controller may include a processor, a communication device (e.g., a wireless communication device), a memory, and one or more communication interfaces.

A controller of the rear derailleur 122 and/or the e-bike controller wirelessly actuates a motor module of the rear derailleur 122 and/or the electric drive motor 146 and operates the rear derailleur 122 for executing gear changes and gear selection. Additionally or alternatively, the controller of the rear derailleur 122 and/or the e-bike controller may be configured to control gear shifting of a front gear changer.

Data from the drive unit 138 (e.g., sensors 141 of the drive unit 138) and/or the crank assembly 118 (e.g., sensors 141 of the drive unit 138) may be transmitted to the e-bike controller. The data may be transmitted via one or more wired connections and/or wirelessly. For example, a crank axle-based torque sensor generates data representing input torque and/or power applied to the crank axle 140 and transmits the data to the e-bike controller.

All the communication between the one or more system control devices 150 of the bicycle 100 (e.g., the e-bike control system 128) and each component is achieved through wired or wireless communication. There may be discrete control with individual wires from the respective system control device 150 to each component to be controlled by the respective system control device 150 (e.g., a motor of the rear derailleur 122), or at least one of the system control devices 150 may use a controller area network ("CAN") bus configured to allow microcontrollers and devices to communicate with each other in applications.

Figure 2:
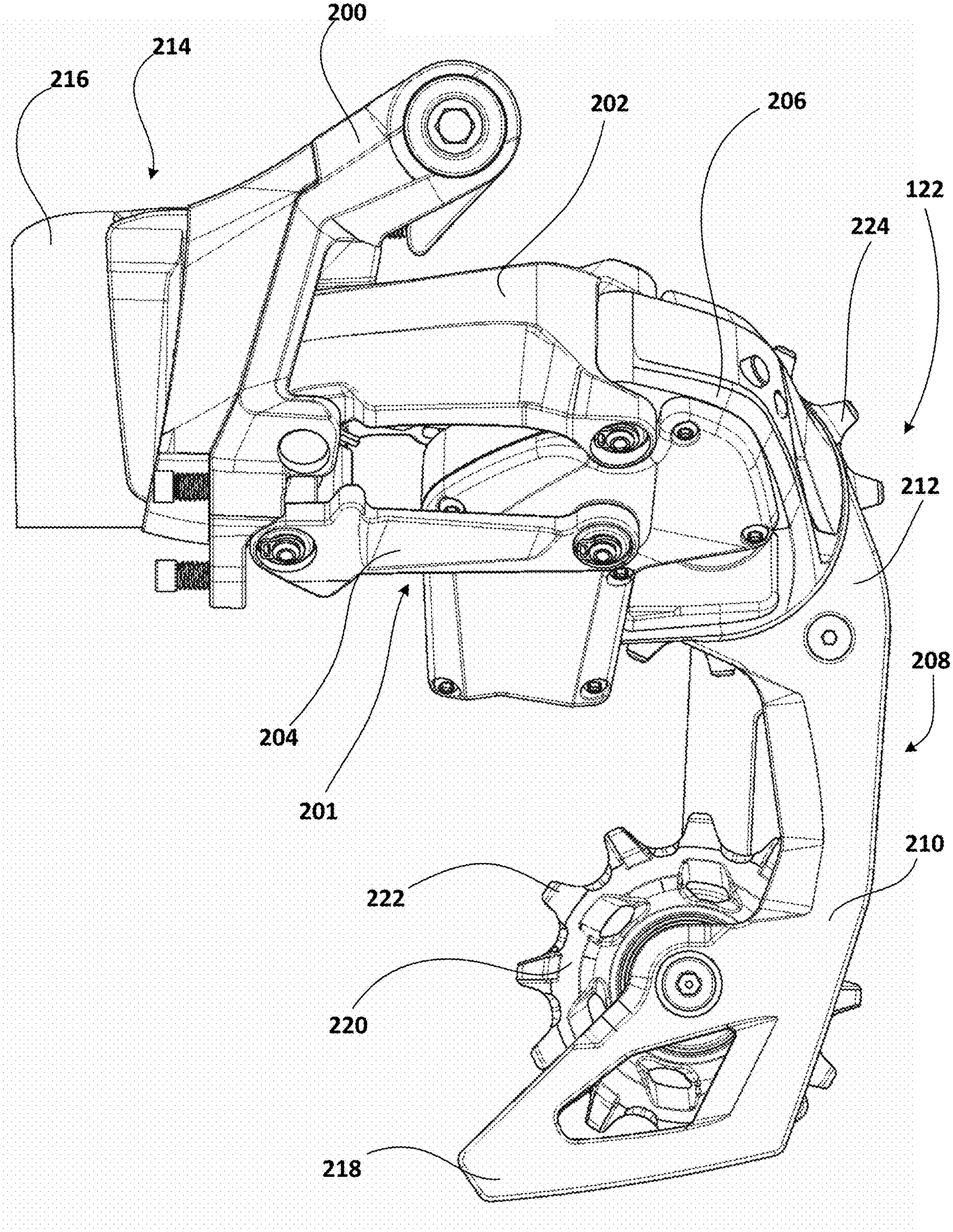
FIG. 2 is a side view of one example of a rear derailleur.

The data transmitted to the system control device 150 may be used for determining an amount of assist to provide via the electric drive motor 146 of the drive unit 138. Alternatively or additionally, the data transmitted to the system control device 150 may be used for automatic shifting. Referring to FIG. 2, the rear derailleur 122 is depicted in these examples as a wireless, electrically actuated rear derailleur mountable to the frame 102 of the bicycle 100. The electric rear derailleur 122 has a base member 200 (e.g., a b-knuckle) that is mountable to the frame 102. A linkage 201 has two links, an outer link 202 and an inner link 204, that are pivotally connected to the base member 200. A movable member 206 (e.g., a p-knuckle) is connected to the linkage 201. A chain guide assembly 208 (e.g., a cage) has a cage plate 210 with a proximal end 212 that is pivotally connected to a part of the movable member 206, as described further below.

A motor module 214 is carried on the electric rear derailleur 122 and has a battery 216. The battery 216 supplies power to the motor module 214. In one example, as illustrated in FIG. 2, the motor module 214 is located in the base member 200. However, the motor module 214 may instead be located elsewhere, such as in the outer link 202 or the inner link 204, or in the movable member 206. The motor module 214 may include, though not shown herein, a gear mechanism or transmission. As is known in the art, the motor module 214 and gear mechanism may be coupled with the linkage 201 to laterally move the cage plate 210 and thus switch the chain 120 among the rear sprockets on the rear cassette 124.

The cage plate 210 also has a distal end 218 that carries a tensioner cog or wheel 220 (e.g., a tensioner wheel). The tensioner wheel 220 also has teeth 222 around a circumference. The cage plate 210 is biased in a chain tensioning direction to maintain tension in the chain 120. The chain guide assembly 208 may also include a second cog or wheel, such as a guide wheel 224 disposed nearer the proximal end 212 of the cage plate 210 and the movable member 206. In operation, the chain 120 is routed around a rear sprocket of the rear cassette 124. An upper segment of the chain 120 extends forward to a chainring 143 of the crank assembly 118 and is routed around the chainring 143. A lower segment of the chain 120 returns from the chainring 143 to the tensioner wheel 220 and is then routed forward to the guide wheel 224. The guide wheel 224 directs the chain 120 to the rear cassette 124. Lateral movement of the cage plate 210, the tensioner wheel 220, and the guide wheel 224 may determine the lateral position of the chain 120 for alignment with a selected rear sprocket of the rear cassette 124.

The battery 216 may instead be an alternate power supply or power source and may operate other electric components of the bicycle 100 within a linked system. The battery 216 or other power supply may also be located in other positions, such as attached to the frame 102. Further, multiple power supplies may be provided, which may collectively or individually power the electric components of the system, including the rear derailleur 122, such as the electric drive motor 146. In this example, however, the battery 216 is configured to be attached directly to the rear derailleur 122, and to provide power only to the components of the rear derailleur 122.

The data transmitted to the system control device 150 may include torque data from one or more sensors 141 (e.g., of the drive unit 138 and/or the crank assembly 118). The torque data may correspond to torque input by a rider at the cranks 123 and may be used by the system control device 150 to control an amount of assist provided by the electric drive motor 146 (e.g., for proportional control of the electric drive motor 146) and/or as an input for controlling an automatic shifting mode of the bicycle 100, for example.

Figure 3:
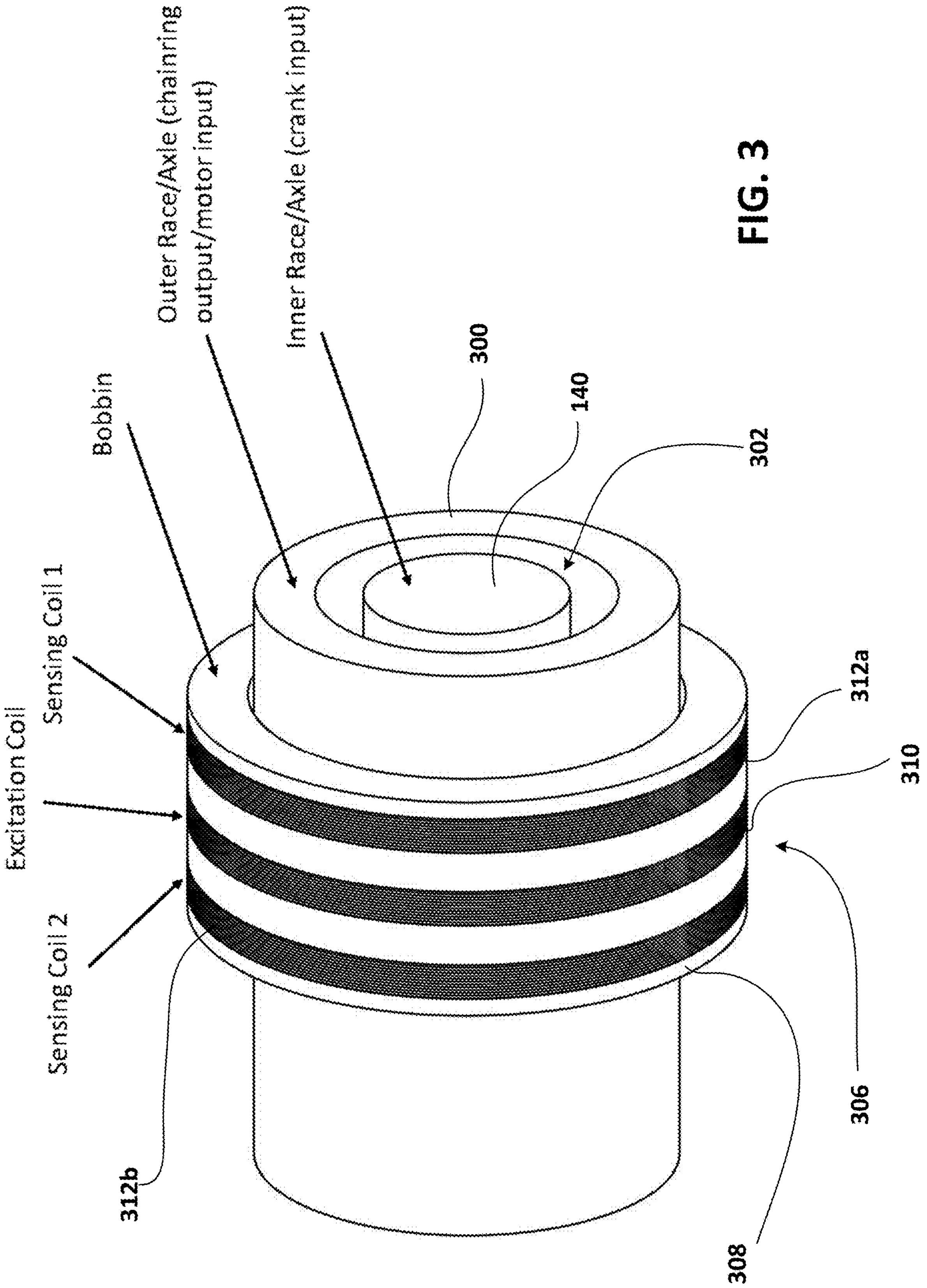
FIG. 3 is a perspective view of a first embodiment of a torque sensor for a bicycle.
Figure 4:
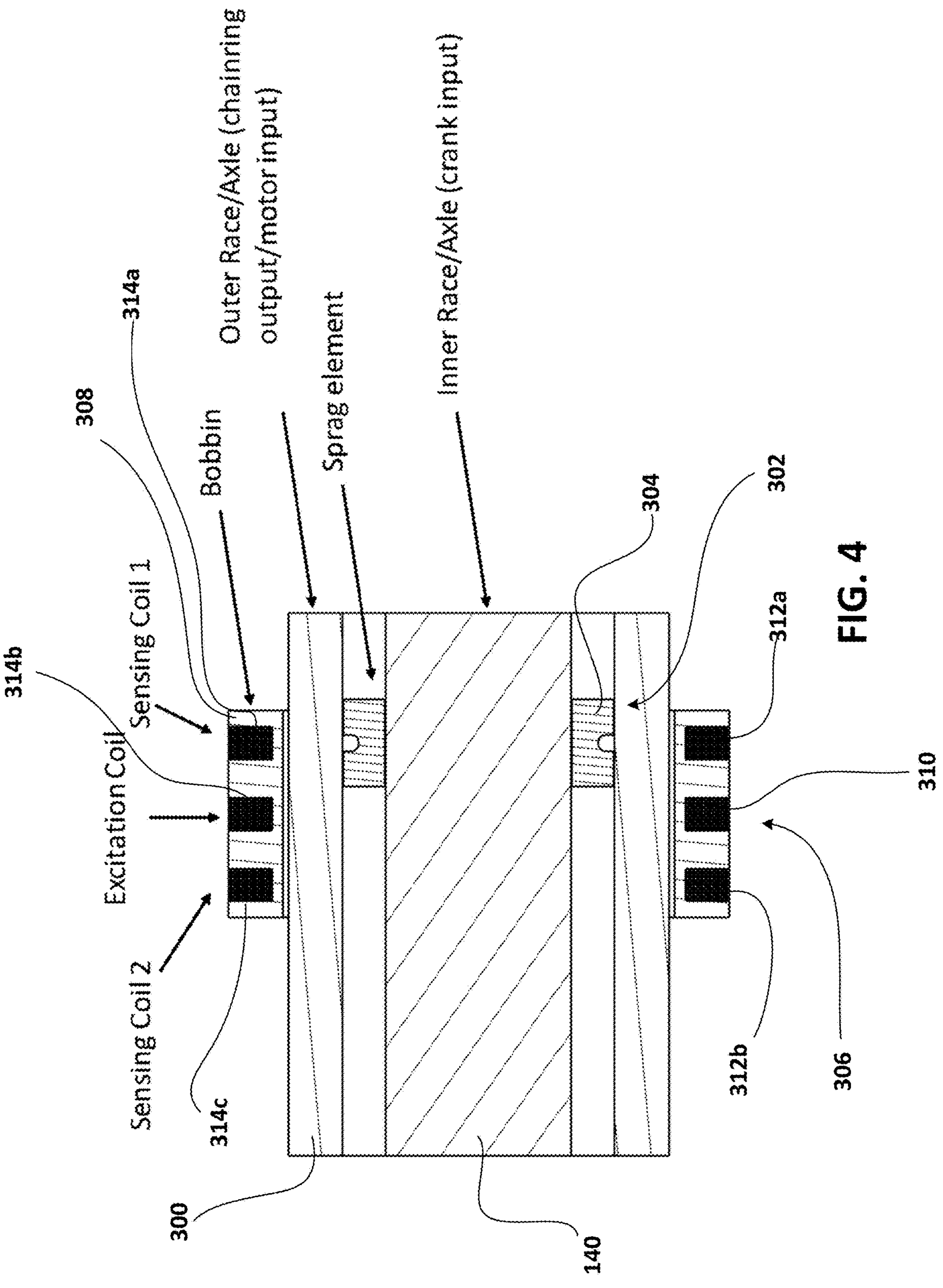
FIG. 4 is a first cross-section of the torque sensor of FIG. 3.

FIGS. 3-6 illustrate a first example of a torque sensor that may generate such torque data for use by the system control device 150, for example. Referring to FIGS. 3 and 4, the crank axle 140 drives an output ring 300 (e.g., chainring output and motor input) of the drive unit 138 in a forward drive direction but not in a back pedaling direction through the use of, for example, a sprag type rotary clutch mechanism 302 (e.g., a clutch mechanism) between the crank axle 140 and the output ring 300. The crank axle 140 acts as an inner race of the clutch mechanism 302, and the output ring 300 acts as an outer race of the clutch mechanism 302.

The crank axle 140 and the output ring 300 are cylindrical in shape. For example, the crank axle 140 is a solid cylinder, and the output ring 300 is a hollow cylinder. In one embodiment, the crank axle 140 is also a hollow cylinder. The crank axle 140 may be made of any number of materials including, for example, steel or an aluminum alloy.

Figure 5:
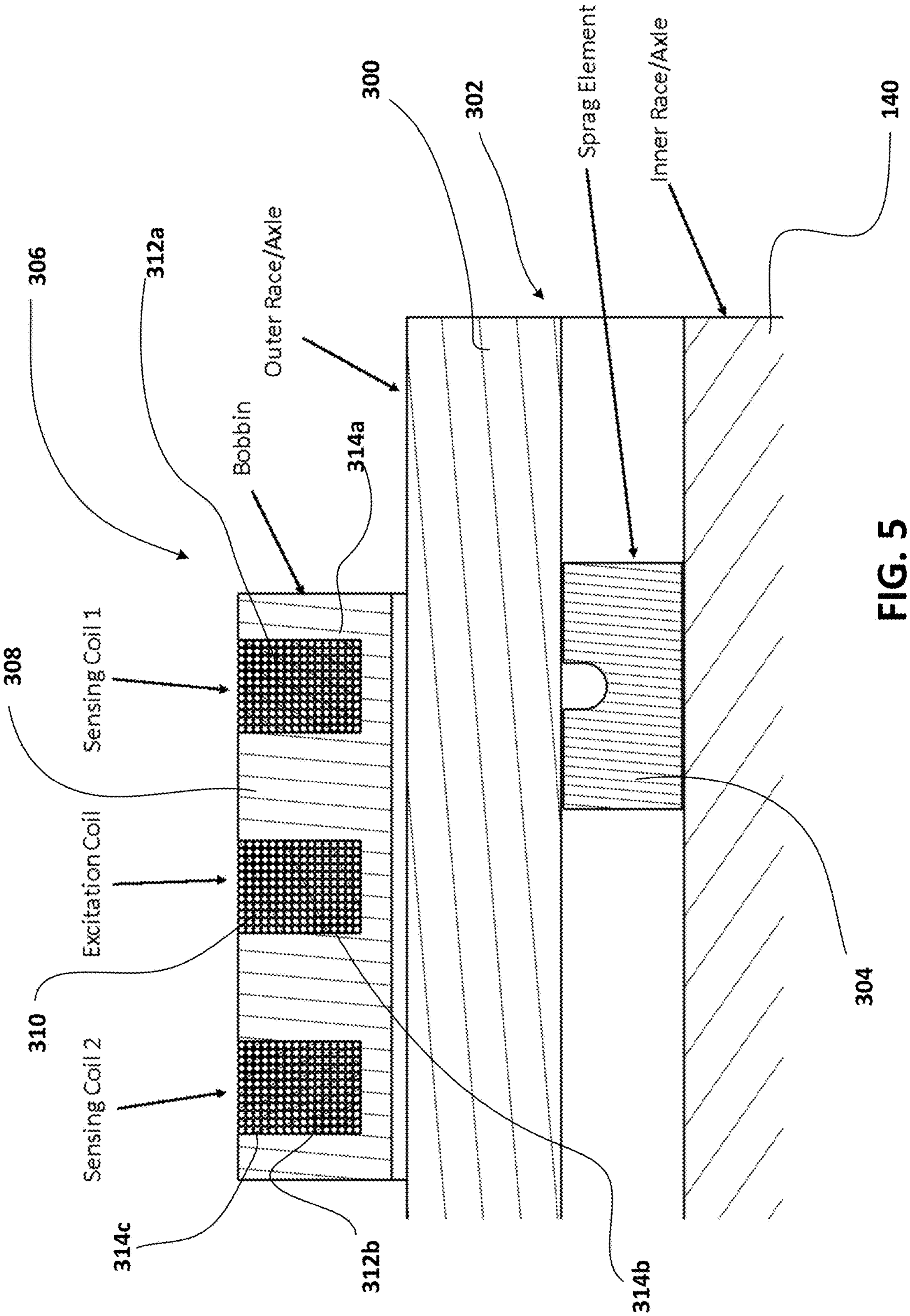
FIG. 5 is a close-up of the cross-section of FIG. 4.
Figure 6:
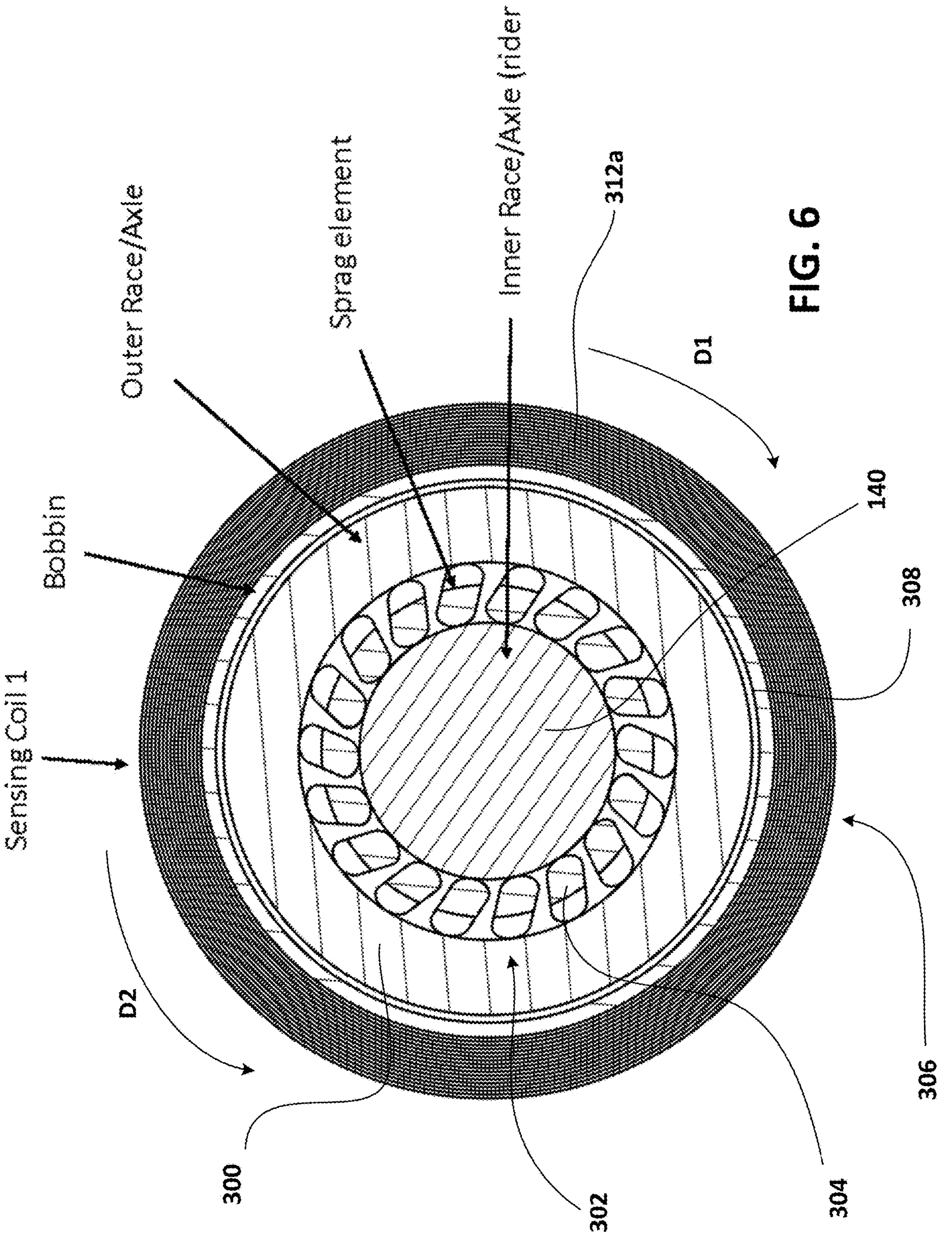
FIG. 6 is a second cross-section of the torque sensor of FIG. 3.

Referring to FIGS. 4-6, the clutch mechanism 302 includes elements 304 disposed between the crank axle 140 and the output ring 300. The elements 304 are, for example, sprag elements (e.g., cam-shaped wedges). Referring to FIG. 6, the clutch mechanism 302 may include any number of sprag elements 304 disposed within a volume between the crank axle 140 and the output ring 300. For example, as shown in FIG. 6, the clutch mechanism 302 may include eighteen sprag elements 304 disposed around the crank axle 140. In other embodiments, the clutch mechanism 302 includes more or fewer sprag elements 304. The sprag elements 304 may be equally spaced relative to each other around the crank axle 140.

Each of the sprag elements 304 (e.g., a longitudinal axis along the respective sprag element 304) is angled relative to a radius of the crank axle 140 through a centroid of the respective sprag element 304. In one embodiment, each of the sprag elements 304 is angled at a same angle. This orientation of the sprag elements 304 relative to the crank axle 140 and the output ring 300 provides that the crank axle 140 and the output ring 300 rotate together (e.g., lock up like a solid shaft) when the crank axle 140 is rotated in a first rotational direction D1. When the crank axle 140 is rotated in a second rotational direction D2 that is opposite the first rotational direction D1 or the output ring 300 is rotated faster than the crank axle 140 (e.g., via the electric drive motor 146), the sprag elements 304 slip or overrun, allowing the crank axle 140 to rotate relative to the output ring 300, or vice versa.

The clutch mechanism 302 generates high strain in the hoop section of the outer race of the clutch mechanism 302 (e.g., the output ring 300). The strain in the hoop section is proportional to reacted torque. Thus, by measuring the strain in the hoop section of the output ring 300, for example, input torque at the cranks 123 may be determined.

The strain in the hoop section of the output ring 300, for example, may be measured by incorporating the output ring 300 into a magnetic path of an electric transformer. The output ring 300 as, for example, the outer race of the clutch mechanism 302 is made of a material (e.g., an alloy) that has linear or predictable magnetostrictive properties. The magnetic permeability of such materials change with applied strain. The electric transformer includes at least one excitation coil energized by an AC voltage, which induces an AC voltage in at least one sensing coil (e.g., at least one sense coil). A magnitude of the AC voltage induced in the at least one sense coil is proportional to a reacted torque in the clutch mechanism 302.

FIGS. 3-6 illustrate a first example of a torque sensor 306 that measures the strain in the hoop section of the output ring 300, for example, in this way. Referring to FIGS. 3-5, the torque sensor 306 includes a support 308 (e.g., a bobbin) that supports an excitation coil 310 and at least one sense coil 312 (e.g., two sense coils). The support 308 is positionally fixed relative to part of the frame 102, and both the crank axle 140 and the output ring 300 are rotatable relative to the support 308. In one embodiment, however, the support 308 may rotate with the output ring 300 and may rotate relative the part of the frame 102.

The support 308 may be any number of shapes and may be made of any number of different materials. For example, the support 308 may be a hollow cylinder and may be made of a ceramic or a glass fiber reinforced resin (e.g., G10-FR4 fiberglass-epoxy laminate material). Other shapes and/or materials may be provided. For example, the support 308 may be made of another material with a low magnetic permeability (e.g., near 1.0) such as, for example, plastics with or without glass fiber reinforcements (e.g., nylon, acetal, and peek).

As shown in FIGS. 3-5, the support 308 may be a single part that supports the excitation coil 310 and the at least one sense coil 312. In another embodiment, the support 308 may be formed by a plurality of separate parts each positionally fixed relative to the frame 102, for example. For example, the support 308 may include three separate parts that support the excitation coil 310 and the two sense coils 312, respectively.

The support 308 may include grooves 314 in which the excitation coil 310 and the at least one sense coil 312 are respectively disposable. In the example of FIGS. 3-6, the torque sensor 306 includes one excitation coil 310 and two sense coils 312 (e.g., three total coils), and three grooves 314 corresponding to the three total coils 310, 312. The torque sensor 306 may include more or fewer sense coil 312, and thus, more or fewer corresponding grooves 314. The grooves 314 extend circumferentially around the support 308.

The excitation coil 310 may be made of any number of materials. For example, the excitation coil 310 may be made of magnet wire (e.g., copper or aluminum magnet wire). The magnet wire, for example, may be wound around the support 308 within a corresponding groove 314 any number of times to form the excitation coil 310. For example, the magnet wire may be wound around the support 308 50 times (e.g., 50 turns) to form the excitation coil 310. In other embodiments, the magnet wire is wound around the support 308 more or fewer times to form the excitation coil 310.

The two sense coils 312, for example, may be made of any number of materials. For example, the two sense coils 312 may be made of magnet wire (e.g., copper or aluminum magnet wire). Magnet wire, for example, may be wound around the support 308 within corresponding grooves 314, respectively, any number of times to form the two sense coils 312. For example, within each of the corresponding grooves 314, magnet wire may be wound around the support 308 50 times (e.g., 50 turns) to form the respective sense coil 312. In other embodiments, the magnet wire is wound around the support 308 more or fewer times to form the sense coils 312, respectively. In one embodiment, each of the two sense coils 312 has a different number of turns than the excitation coil 310 (e.g., 50 turns), but the two sense coils 312 have a same number of turns (e.g., 60 turns). Varying a ratio of turns in the excitation coil 310 to turns in the two sense coils 312 allows for varying signal gain.

Referring to FIGS. 4 and 5, the excitation coil 310 and the two sense coils 312 are positioned concentrically around the support 308, and thus concentrically around the output ring 300, for example. A first sense coil 312*a* of the two sense coils 312 is positioned over a maximum hoop strain region of the clutch mechanism 302. For example, a first groove 314*a* of the grooves 314 and the first sense coil 312*a* are positioned over the sprag elements 304. In one embodiment, as is shown in FIGS. 4 and 5, the first sense coil 312*a* is axially centered relative to the sprag elements 304. In another embodiment, the first sense coil 312*a* overlaps the sprag elements 304 but is not axially centered relative to the sprag elements 304.

The excitation coil 310 is positioned adjacent to the maximum hoop strain region of the clutch mechanism 302. For example, a second groove 314*b* of the grooves 314 and the excitation coil 310 are adjacent to the first groove 314*a* and the first sense coil 312*a* (e.g., offset in an axial direction relative to the first groove 314*a* and the first sense coil 312*a* by 1 mm, 2 mm, 3 mm, or 4 mm).

A second sense coil 312*b* of the two sense coils 312 is positioned adjacent to the excitation coil 310. For example, a third groove 314*c* of the grooves 314 and the second sense coil 312*b* are adjacent to the excitation coil 310 (e.g., offset in an axial direction relative to the second groove 314*b* and the excitation coil 310 by 1 mm, 2 mm, 3 mm, or 4 mm), such that the second sense coil 312*b* and the first sense coil 312*a*, and corresponding grooves 314*c* and 314*a*, respectively, are on opposite sides of the excitation coil 310 and the second groove 314*b*. In one embodiment, as is shown in FIGS. 4 and 5, the third groove 314*c* and the second sense coil 312*b* are offset relative to the second groove 314*b* and the excitation coil 310 a same amount, though in an opposite direction, as the first groove 314*a* and the first sense coil 312*a* are offset relative to the second groove 314*b* and the excitation coil 310.

Figure 4B:
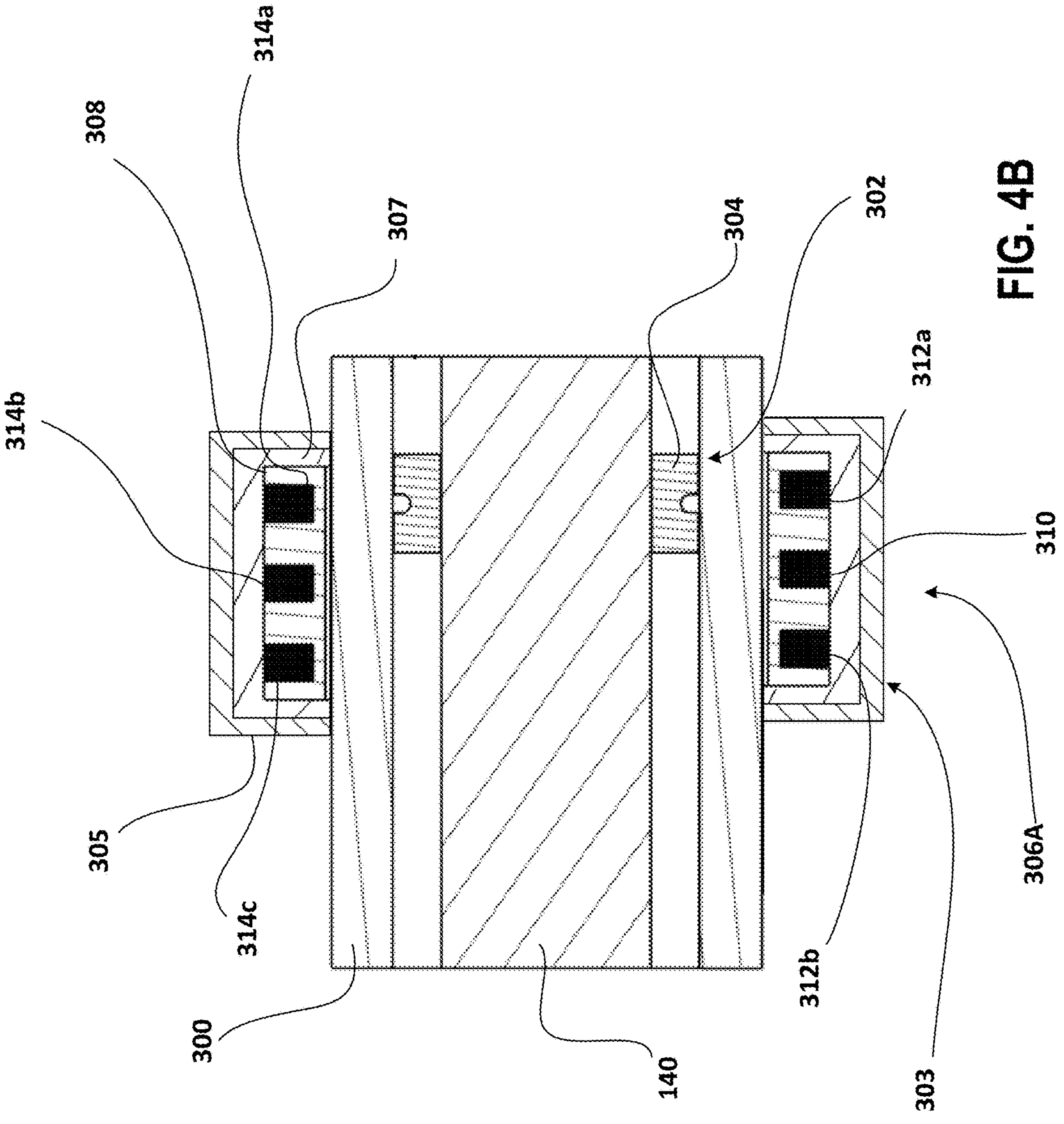
FIG. 4B is a cross-section of a torque sensor similar to the torque sensor of FIG. 3 and including a shield.

As illustrated in an embodiment presented in FIG. 4B, the torque sensor 306A may also include a shield 303. The shield 303 may include an outer shield 307 and an inner shield 307. The shield is described further herein with discussion related to FIGS. 29-30 and throughout.

Figure 7:
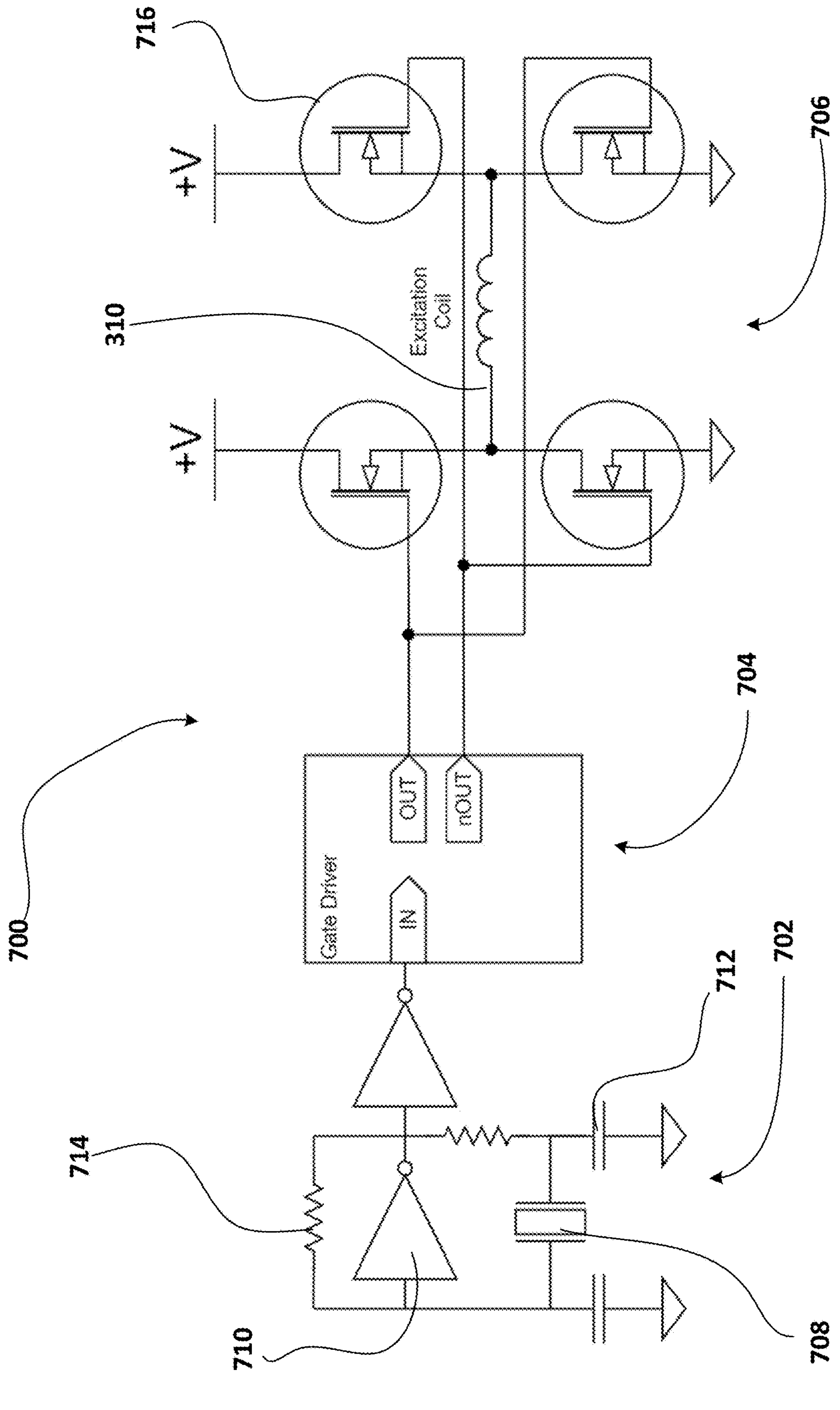
FIG. 7 is a circuit diagram of one embodiment of an excitation coil driver for a torque sensor.
Figure 8:
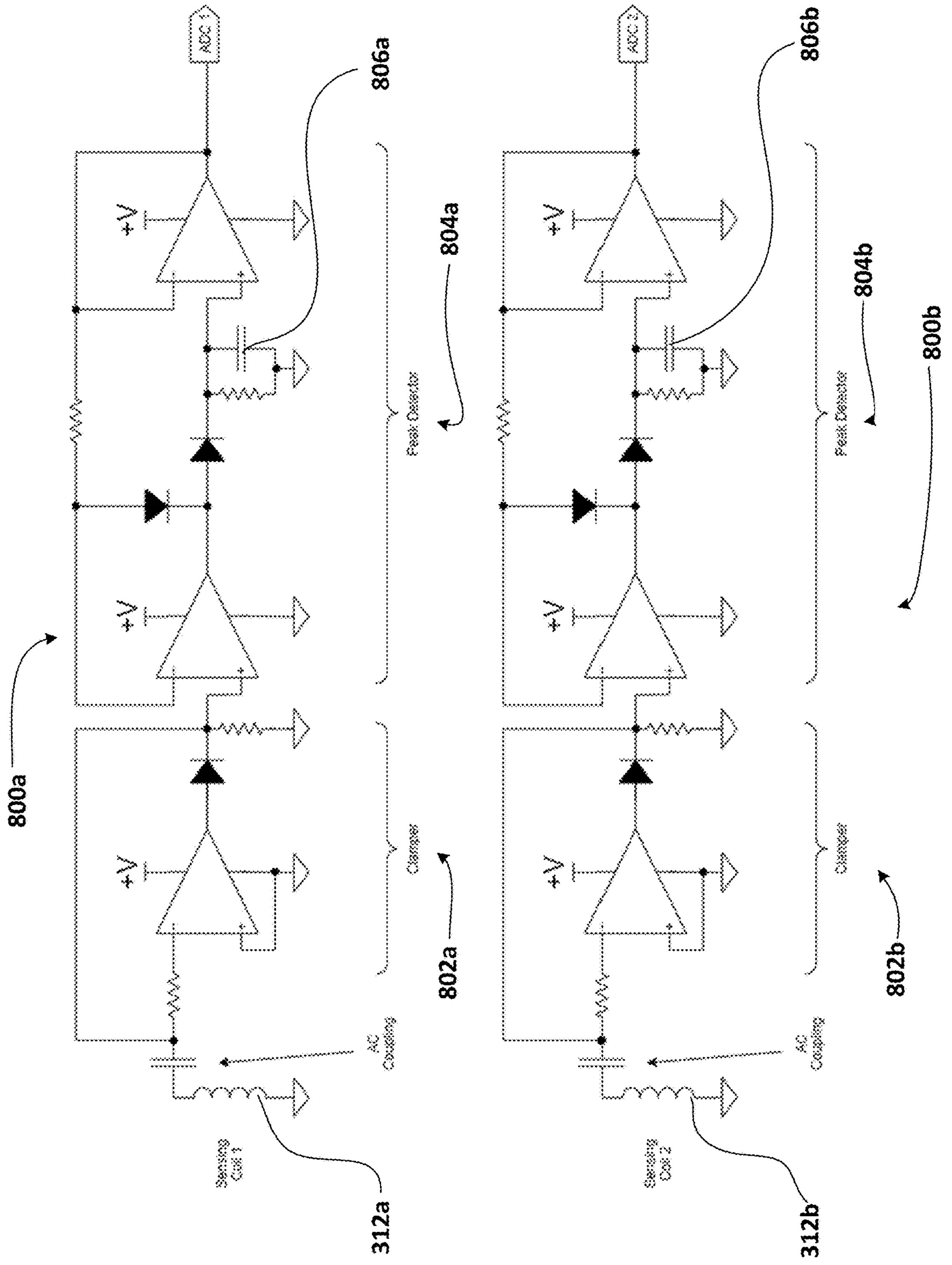
FIG. 8 is a circuit diagram of a first example of sensor signal conditioning.
Figure 9:
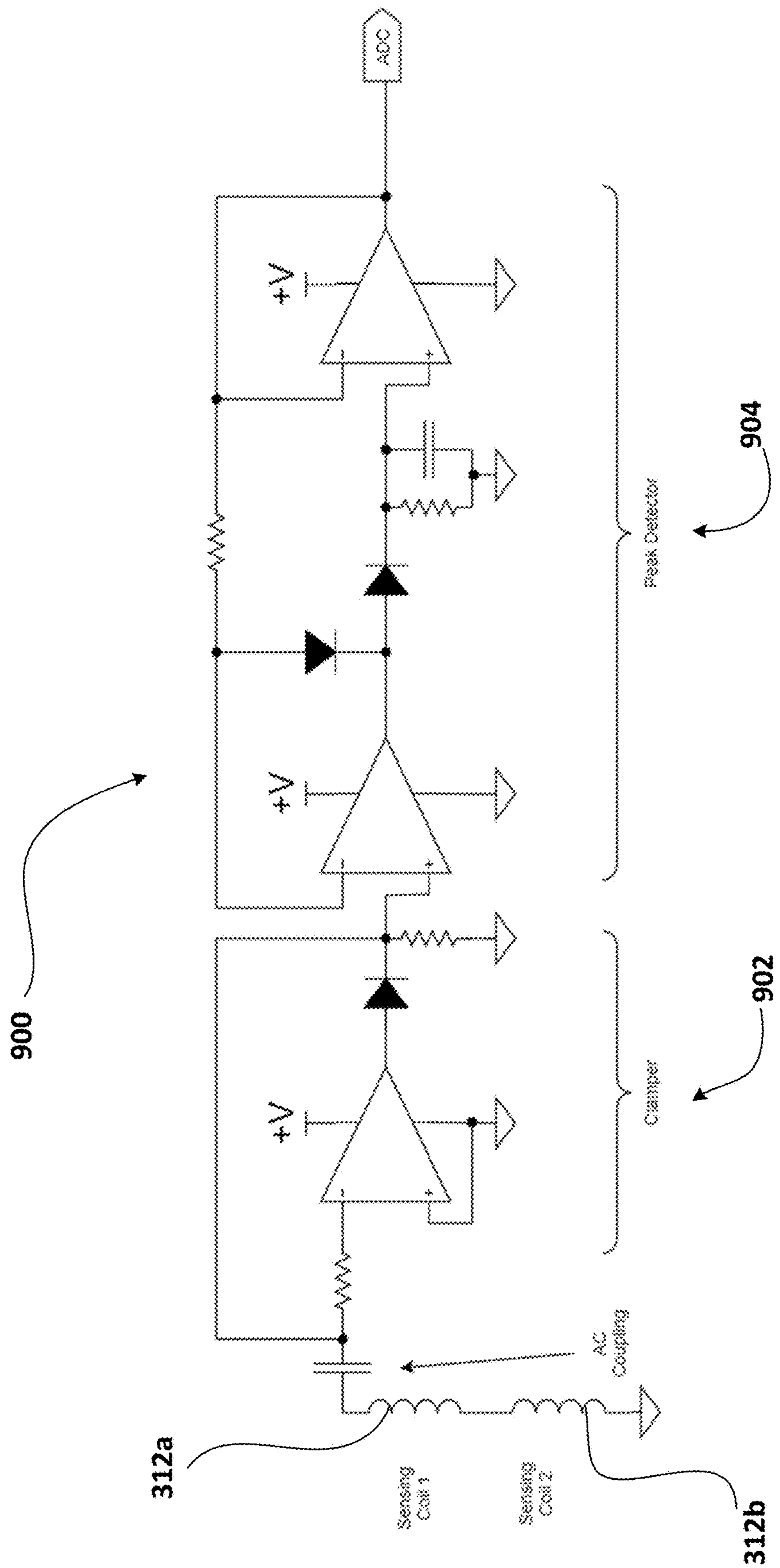
FIG. 9 is a circuit diagram of a second example of sensor signal conditioning.

Referring again to FIGS. 4-6, the torque sensor 306 is electrically connected to electronics to power the excitation coil 310 and process signals at the sense coils 312. FIGS. 7-9 show examples of such electronics (e.g., circuits) that may be included within and/or used with the torque sensor 306 and/or other torque sensors of the present embodiments (see, FIGS. 22-30). FIG. 7 shows an example of an excitation coil driver circuit 700 that may power the excitation coil 310. The electronics may include a number of excitation coil driver circuits 700, for example, that corresponds to a number of excitation coils of a particular torque sensor (e.g., two excitation coil driver circuits for the torque sensor of FIGS. 22-30) The excitation coil driver circuit 700 generates an AC voltage. The generated AC voltage may be sinusoidal, square, triangular, or another shape.

In the example shown in FIG. 7, the excitation coil driver circuit 700 includes an oscillator circuit 702, a power amplifier 704, and an H-bridge circuit 706. The excitation coil driver circuit 700 may include additional, fewer, and/or different circuits, and/or may include additional, fewer, and/or different electronic components. For example, the excitation coil driver circuit 700 may include a tank oscillator such as, for example, a colpitts oscillator circuit.

In the example shown in FIG. 7, the oscillator circuit 702 is a crystal oscillator circuit. The crystal oscillator circuit 702 may generate, for example, a digital square wave, though another circuit that generate a different periodic signal may be used. The digital square wave controls, for example, switches of, for example, the H-bridge circuit 706, such that a voltage is switched across the excitation coil 310.

The crystal oscillator circuit 702, which may provide frequency stability, includes a crystal 708 (e.g., of piezoelectric material such as quartz), inverting amplifiers 710 (e.g., two inverting amplifiers), capacitors 712 (e.g., two capacitors), and resistors 714 (e.g., two resistors). An output of the crystal oscillator circuit 702 is, for example, a digital square wave signal with an output frequency. The output frequency may depend on the crystal used and how the crystal is manufactured (e.g., shape and size).

The output of the crystal oscillator circuit 702 is input to the power amplifier 704. This input to the power amplifier 704 (e.g., the output of the crystal oscillator circuit 702) is, for example, a low-power input, and the power amplifier 704 generates a high-current drive input for transistors of the H-bridge circuit 706.

In the example shown in FIG. 7, the power amplifier 704 is a gate driver. The gate driver 704, for example, may include a level shifter in combination with an amplifier. The gate driver 704, for example, is an interface between the digital output of the crystal oscillator circuit 702 (e.g., a square wave output of the crystal oscillator circuit 702) and switches of the H-bridge circuit 706. The gate driver 704, for example, interfaces the digital output of the crystal oscillator circuit 702 to voltage levels appropriate to control the switches of the H-bridge circuit 706.

In the example shown in FIG. 7, the H-bridge circuit 706 includes four power MOSFETSs 716, though other switches may be used. The digital square wave signal, for example, output by the crystal oscillator circuit 702 controls, via, for example, the gate driver 704, the four power MOSFETs 716, which switch a voltage across the excitation coil 310. The controlled power MOSFETs 716 switch the voltage across the excitation coil 310, such that: when the square wave is at a high state, one end of the excitation coil 310 is connected to a positive voltage, and the other end of the excitation coil 310 is connected to ground; and when the square wave is at a low state, the polarities are switched, such that the one end of the excitation coil 310 is connected to ground and the other end of the excitation coil 310 is connected to the positive voltage. An output of the H-bridge circuit 706, and thus the crystal oscillator circuit 702, is an alternating current in the excitation coil 310.

The alternating current at the excitation coil 310 induces an alternating current in each of the two sense coils 312. In one embodiment, outputs of the two sense coils 312 are connected directly to a microcontroller analog to digital converter (ADC) or to a discrete ADC. Alternatively, as shown in the examples of FIGS. 8 and 9, the outputs of the two sense coils 312 may first be conditioned by analog circuits, such as, for example, a clamping circuit and/or a peak detector circuit. As shown in the example of FIG. 8, signals from each of the first sense coil 312*a* and the second sense coil 312*b* may be conditioned independently. For example, a first signal conditioner circuit 800*a* electrically connected to the first sense coil 312*a* includes a first clamping circuit 802*a* and a first peak detector circuit 804*a*, and a second signal conditioner circuit 800*b* electrically connected to the second sense coil 312*b* includes a second clamping circuit 802*b* and a second peak detector circuit 804*b*.

The induced voltage in each of the two sense coils 312*a*, 312*b* has a peak-to-peak voltage proportional to a torque in a measured element (e.g., the output ring 300). Each of the signal conditioner circuits 800*a*, 800*b* conditions the respective induced alternating current (e.g., a respective high frequency AC signal) into a lower frequency DC signal that may be sampled by an ADC. The clamping circuits 802*a*, 802*b* adjust the induced alternating voltages at the sense coils 312*a*, 312*b*, respectively, to be entirely positive, such that a minimum voltage is at approximately ground. By shifting the signals above ground, sensitivity may be doubled (e.g., since measuring an actual peak-to-peak voltage).

The peak detector circuits 804*a*, 804*b* perform a voltage ratcheting function, which charges a respective capacitor 806*a*, 806*b* to a highest observed voltage and slowly drains the respective capacitor. Outputs of the peak detector circuits 804*a*, 804*b* may then be sampled by corresponding ADCs. Within a respective peak detector circuit 804*a*, 804*b*, a combination of a capacitor and resistor voltage dictates a bandwidth of the respective peak detector circuit 804*a*, 804*b*. In one embodiment, the excitation coil 310 may run at 90 kHz, while the respective peak detector circuit 804*a*, 804*b* is sensitive to approximately 100 Hz, though other frequencies may be used.

The measured signal on the first sense coil 312*a*, which is in the high strain region of the outer race of the clutch mechanism 302, may change similarly with torque compared to the measured signal on the second sense coil 312*b* (e.g., outside of the high strain region of the outer race of the clutch mechanism 302), though an opposite sign. A microcontroller (e.g., the system controller 150 or another controller on the bicycle 100) may receive the measured signals (e.g., converted signals from the ADCs) and determine a difference between the measured signals (e.g., a differential voltage). The differential voltage varies with torque but may eliminate any sensor offset or drift caused by thermal expansion of elements of the clutch mechanism 302 and/or the torque sensor 306. The microcontroller may determine a reacted torque based on the differential voltage. For example, the reacted torque may be determined based on a predetermined function (e.g., determined experimentally) using the differential voltage as an input.

In the example shown in FIG. 9, signals from the first sense coil 312*a* and the second sense coil 312*b* may be conditioned together, such that only the differential voltage is measured in a single ADS input. The first sense coil 312*a* and the second sense coil 312*b* are connected in series, and the outputs of the first sense coil 312*a* and the second sense coil 312*b* are conditioned together. For example, a single signal conditioner circuit 900 electrically connected to the first sense coil 312*a* and the second sense coil 312*b* includes a single clamping circuit 902 and a single peak detector circuit 904.

The signal conditioner circuits 800*a*, 800*b*, 900 may include more, different, and/or additional components. For example, before the ADC(s), the measured signals may be further amplified with, for example, an operational amplifier. Further, noise in the measured signals may be reduced before the ADC(s) with a low pass filter. Other components may be included.

The drive unit 138 and/or the frame 102 of the bicycle 100 may support the torque sensor 306, circuits driving the torque sensor 306, and circuits processing signals measured by the torque sensor 306.

Figure 10:
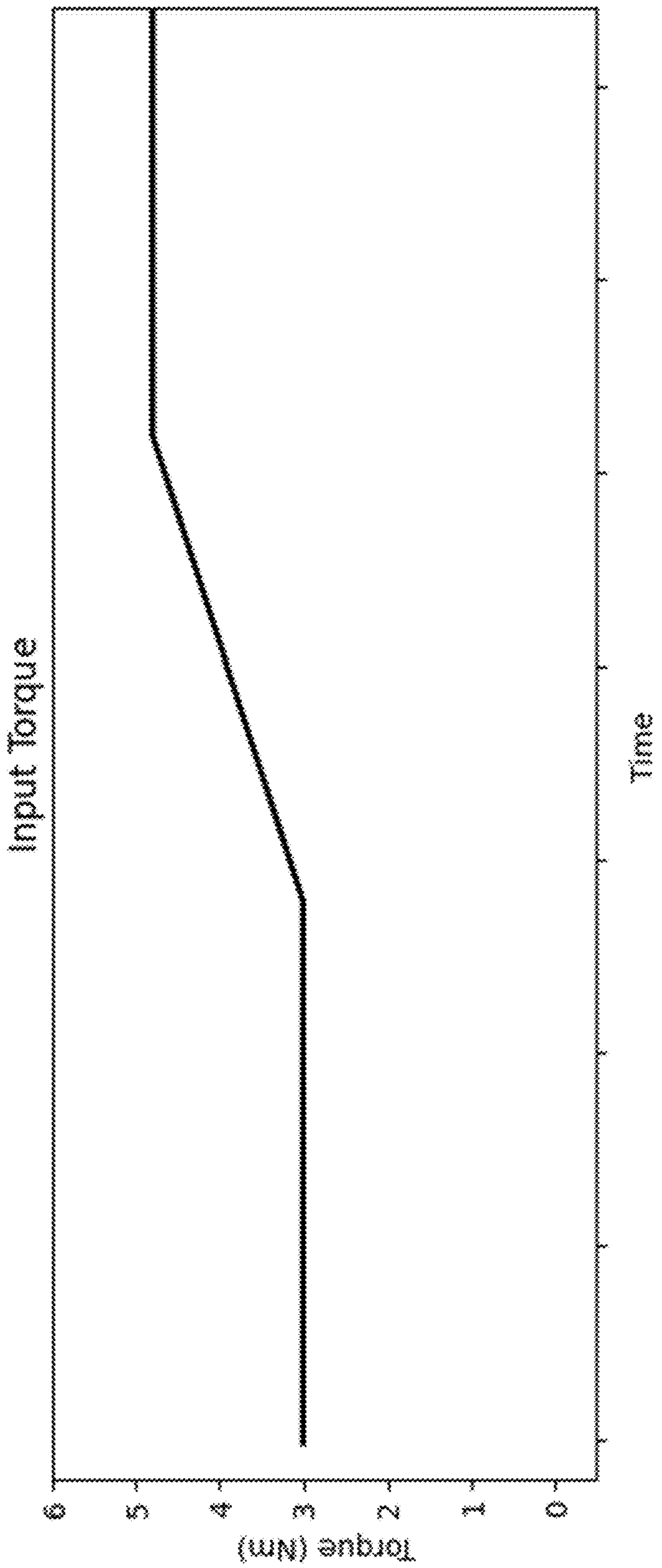
FIG. 10 is an example of a graph of input torque versus time.
Figure 11:
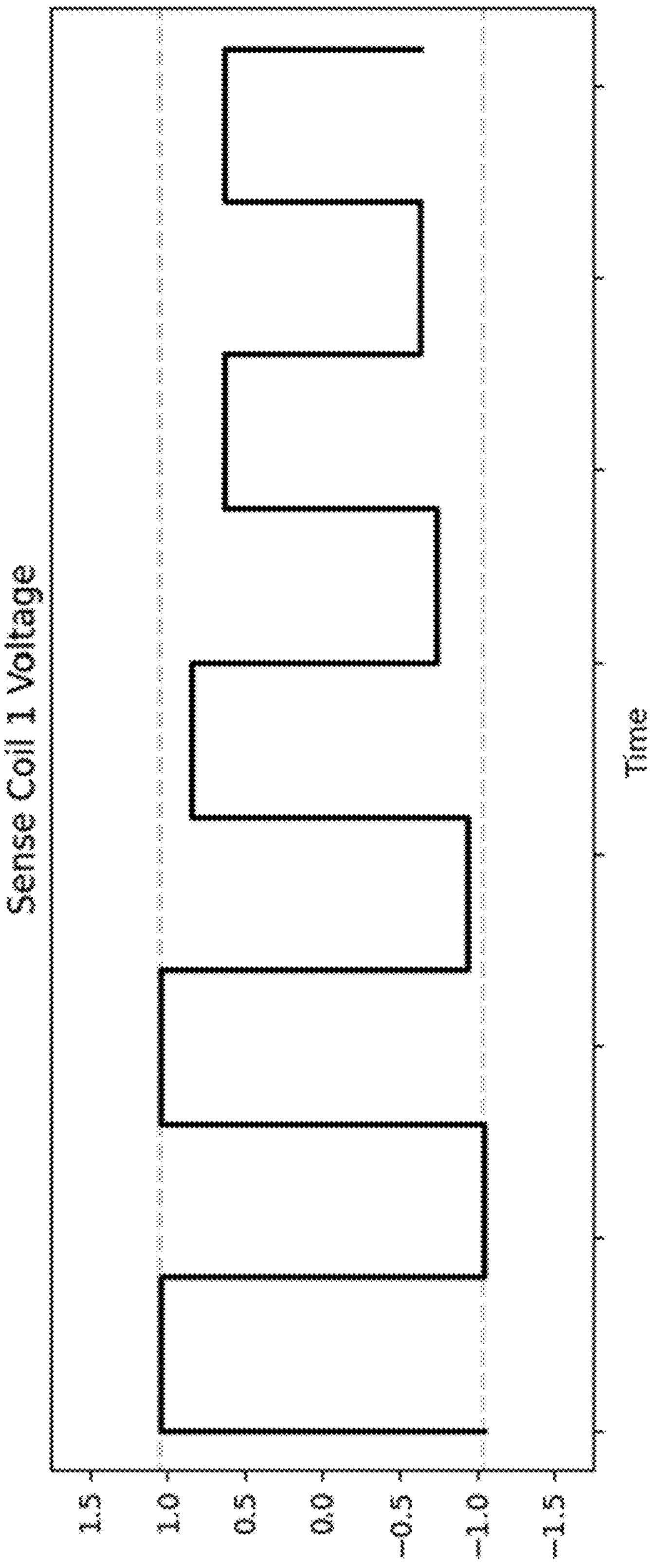
FIG. 11 is an example of a graph of sensed voltage versus time corresponding to the input torque shown in FIG. 10, for a first sense coil of a torque sensor.
Figure 12:
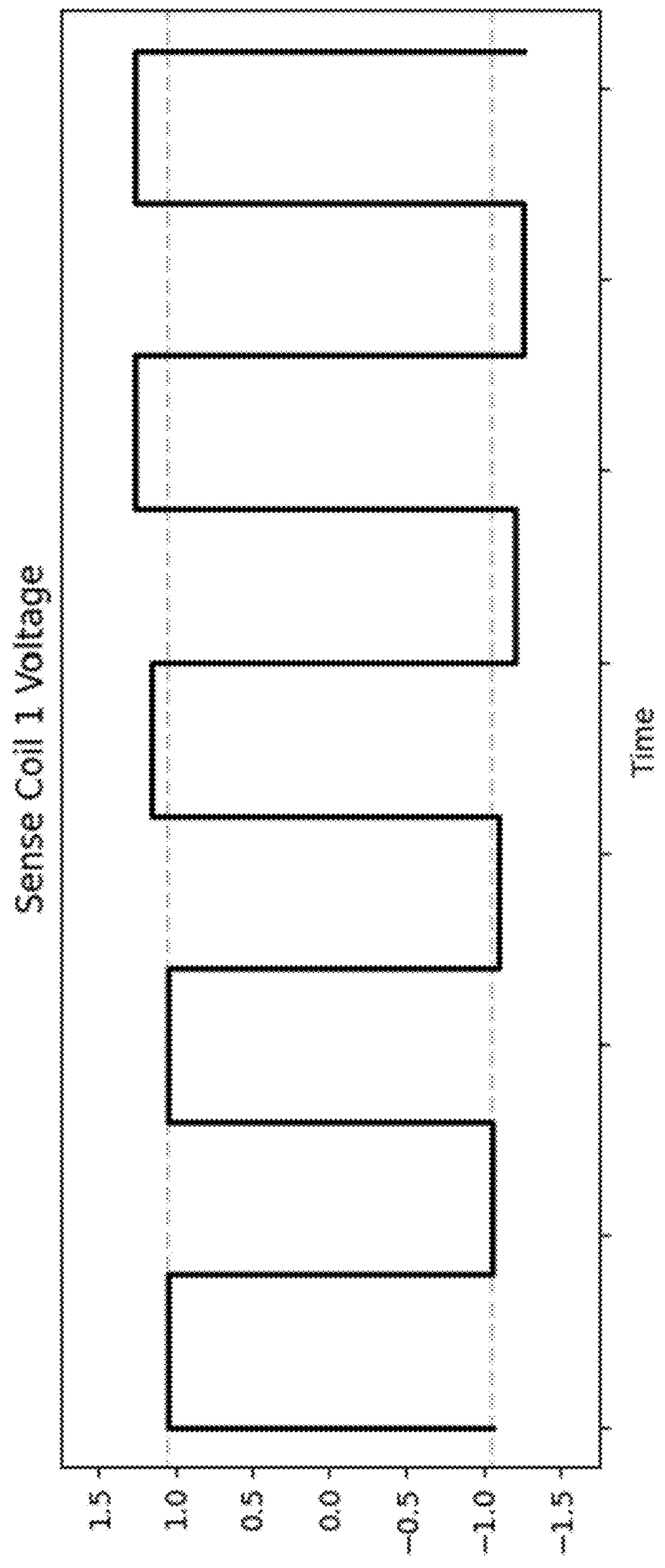
FIG. 12 is an example of a graph of sensed voltage versus time corresponding to the input torque shown in FIG. 10, for a second sense coil of a torque sensor.

FIGS. 10-16 are graphs showing exemplary signals discussed above with reference to the torque sensor 306 and the circuits of FIGS. 7-9, respectively. FIG. 10 is a graph showing an example of input torque versus time. FIGS. 11 and 12, which correspond to the input torque of FIG. 10, show how voltages induced in sense coils are affected by input torque. For example, FIGS. 11 and 12 are graphs showing output voltage versus time at a first sense coil (e.g., the first sense coil 312*a* over the sprag elements 304) and at a second sense coil (e.g., the second sense coil 312*b*), respectively. As illustrated by FIG. 11, the peak-to-peak voltage decreases with increasing applied torque at the first sense coil, while, as illustrated by FIG. 12, the peak-to-peak voltage increases with increasing applied torque at the second sense coil.

Figure 13:
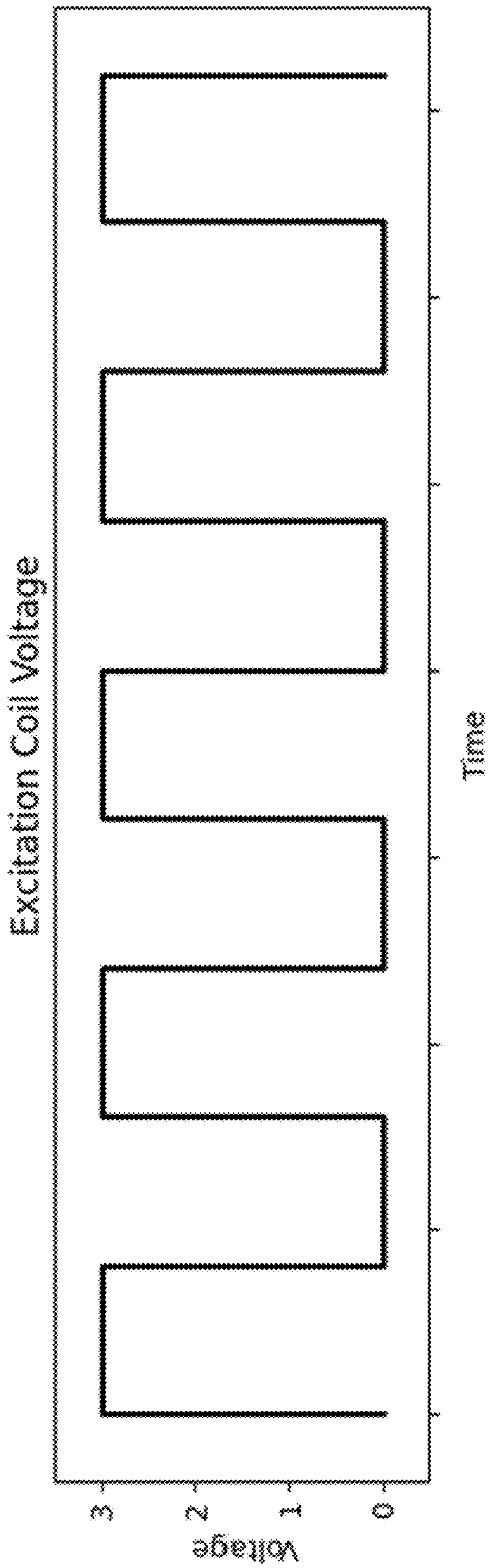
FIG. 13 is an example of a graph of excitation voltage versus time in an excitation coil of a torque sensor.
Figure 14:
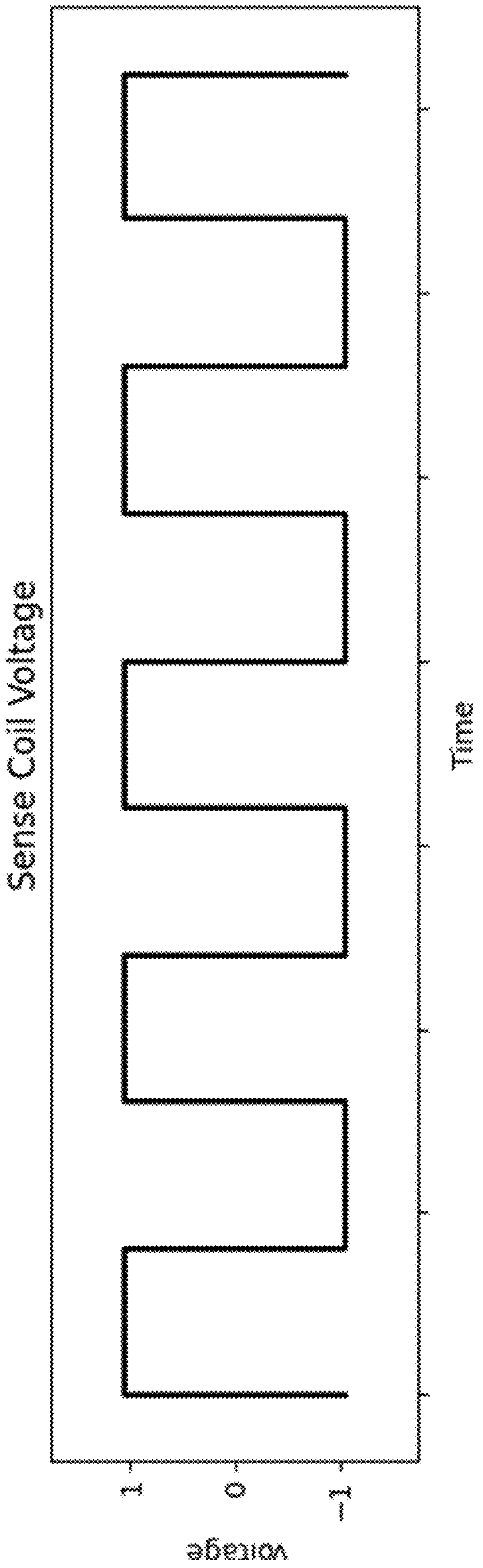
FIG. 14 is an example of a graph of sensed voltage versus time corresponding to the excitation voltage shown in FIG. 13, for a sense coil of a torque sensor.
Figure 15:
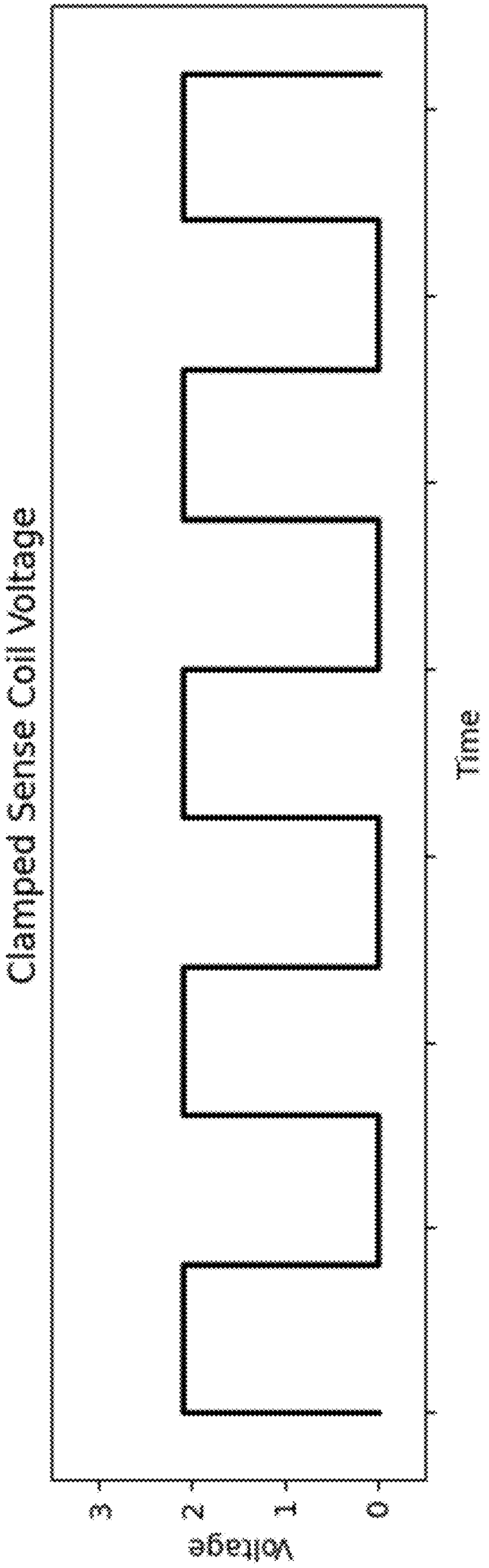
FIG. 15 is an example of a graph of sensed voltage versus time corresponding to the excitation voltage shown in FIG. 13, after clamping.
Figure 16:
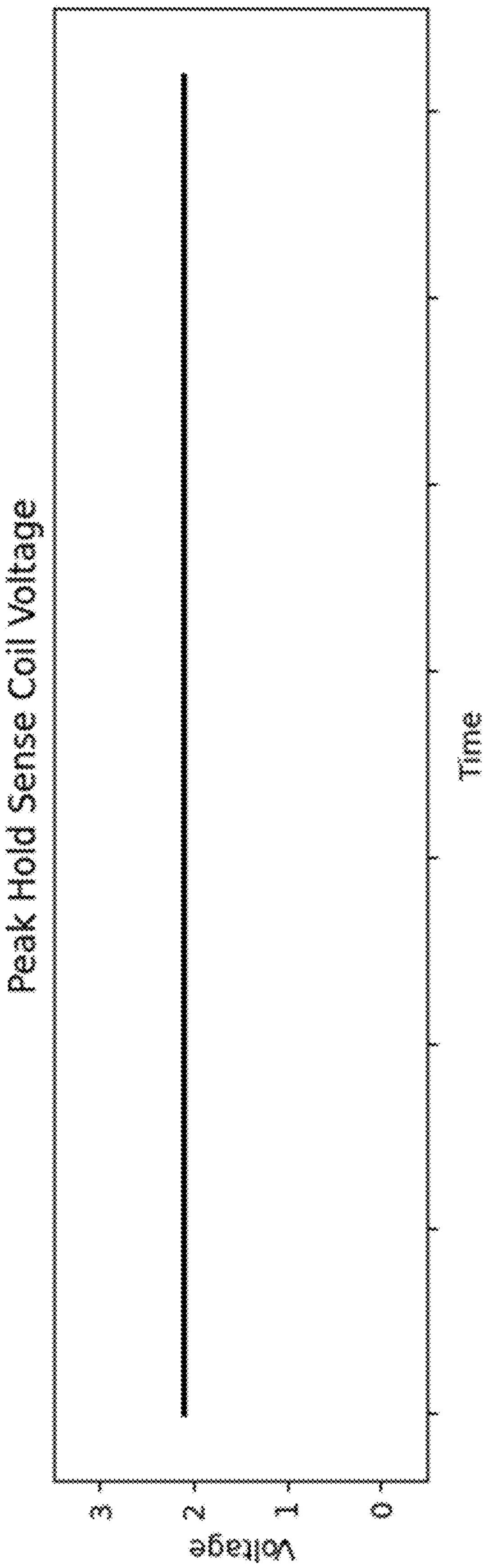
FIG. 16 is an example of a graph of sensed voltage versus time corresponding to the excitation voltage shown in FIG. 13, after clamping and peak detection.
Figure 17:
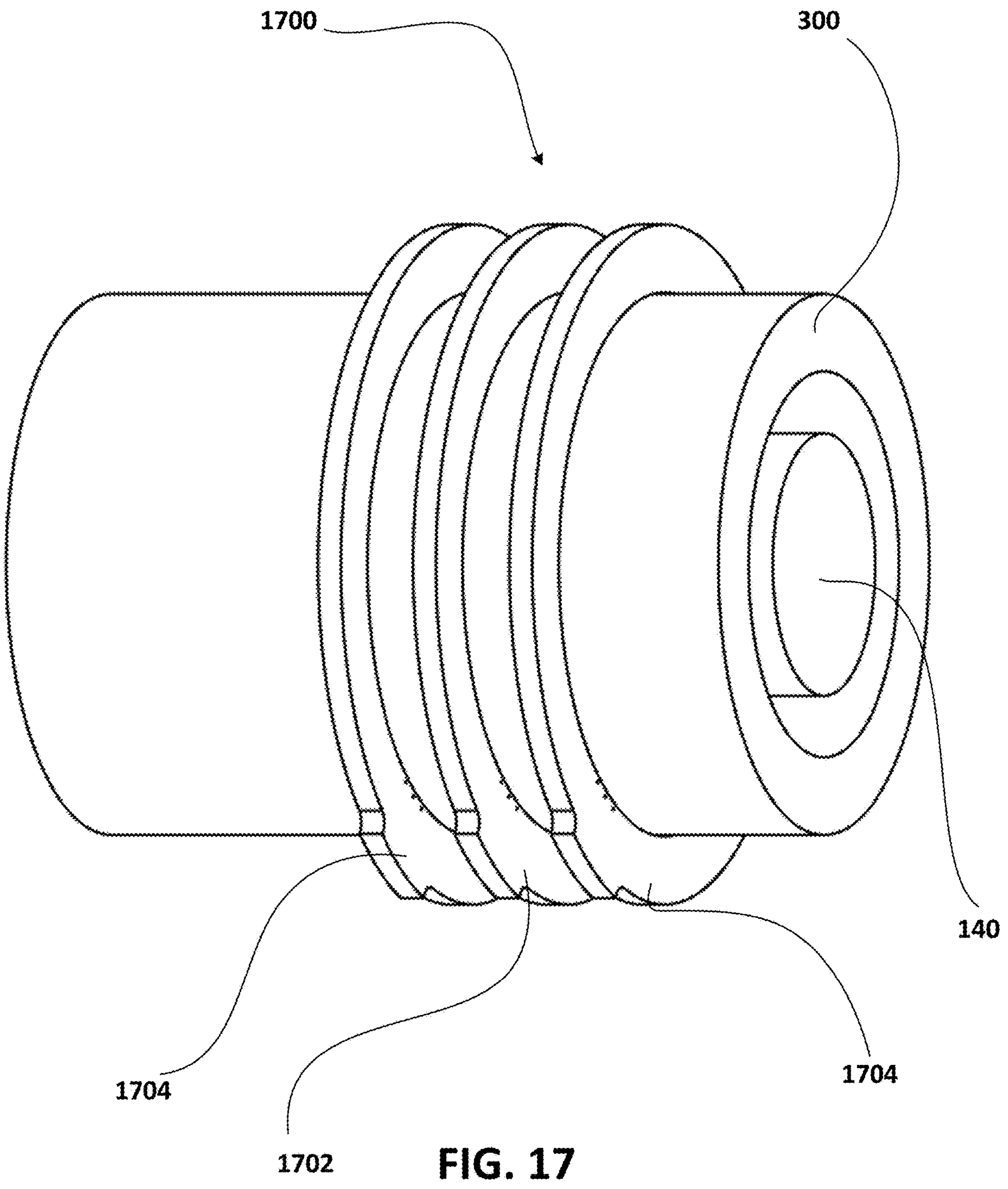
FIG. 17 is a perspective view of a second embodiment of torque sensor for a bicycle.
Figure 18:
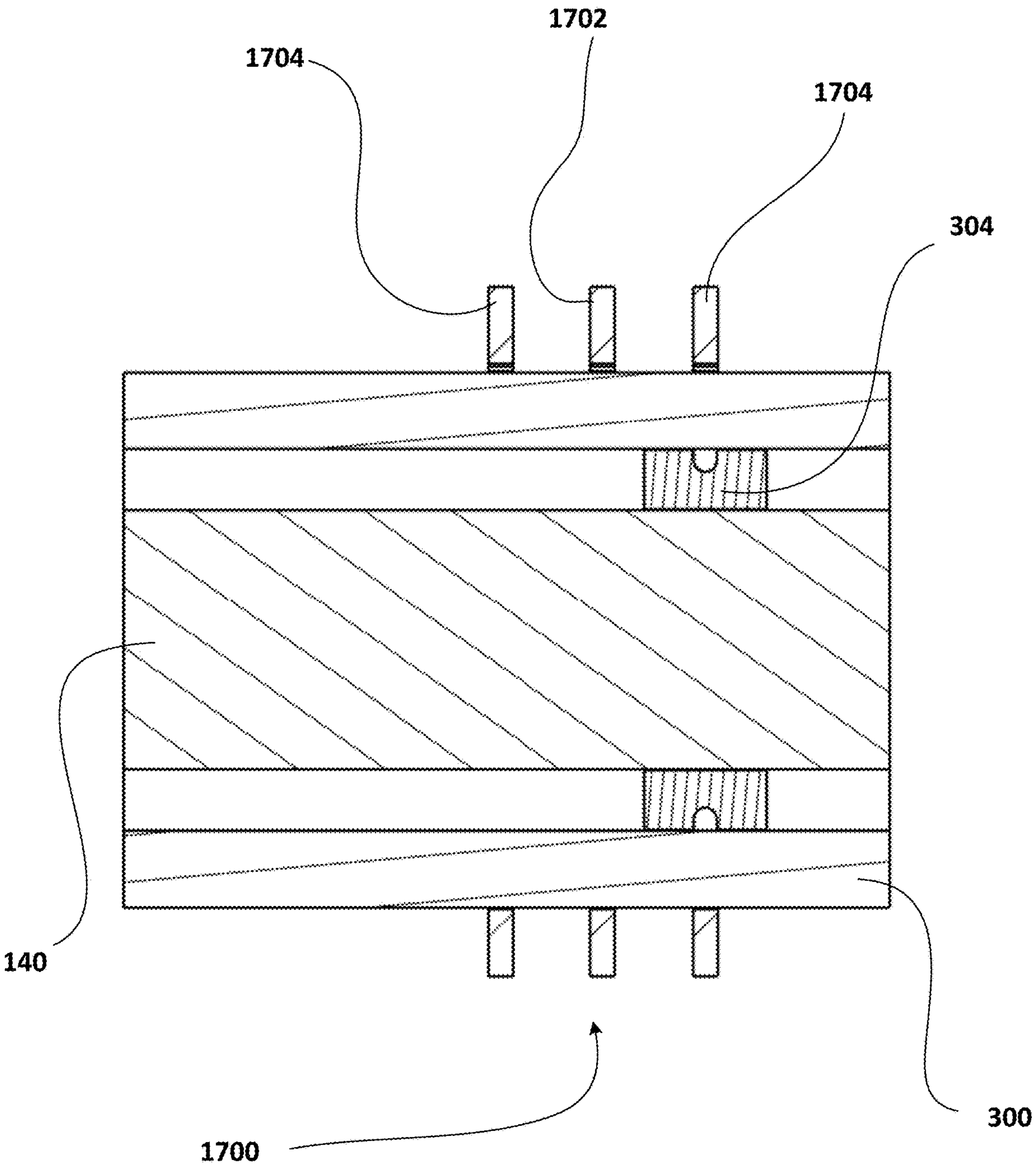
FIG. 18 is a first cross-section of the torque sensor of FIG. 17.
Figure 19:
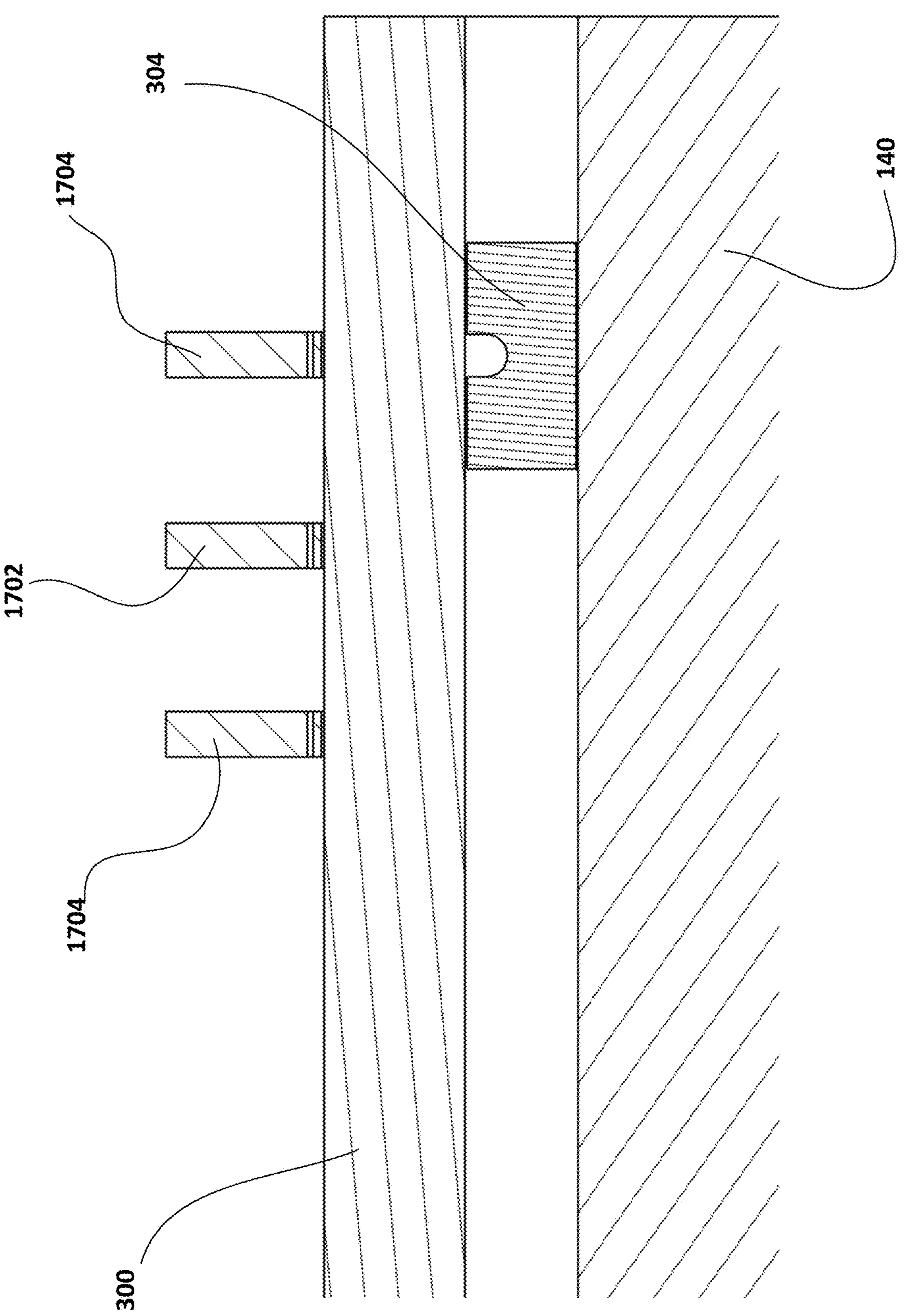
FIG. 19 is a close-up of the cross-section of FIG. 18.
Figure 20:
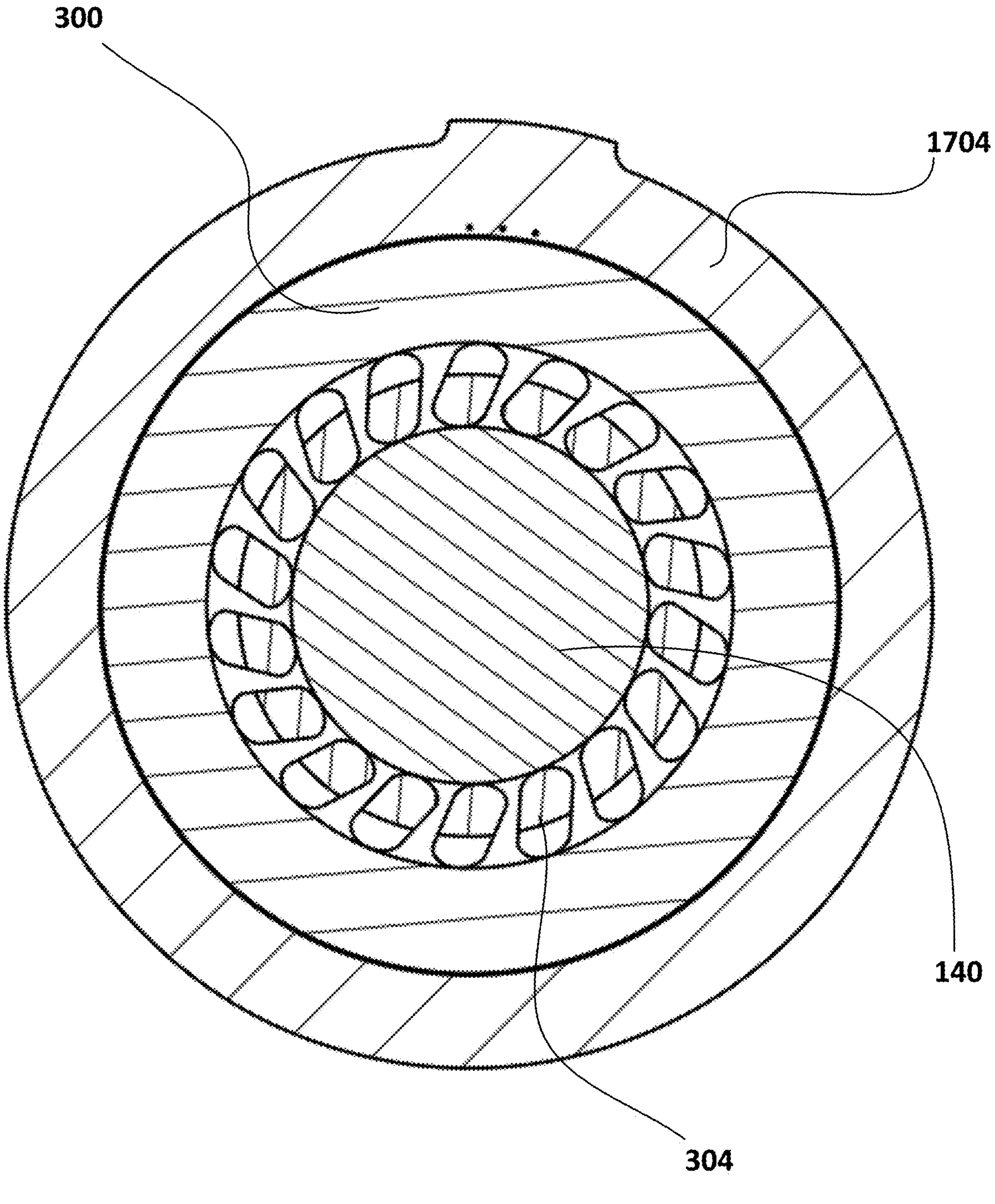
FIG. 20 is a second cross-section of the torque sensor of FIG. 17.

FIG. 13 is a graph showing an example of voltage in an excitation coil (e.g., the excitation coil 310) versus time. The voltage in the excitation coil is constant with torque. FIG. 14 is a graph showing an example of voltage (e.g., measured voltage) in a sense coil (e.g., the first sense coil 312*a* or the second sense coil 312*b*). FIG. 15 is a graph showing an example of the measured voltage after clamping (e.g., at an output of the first clamping circuit 802*a* or the second clamping circuit 802*b*). FIG. 16 is a graph showing an example of the measured voltage after clamping and peak detection (e.g., at an output of the first peak detector circuit 804*a* or the second peak detector circuit 804*b* and before input to an ADC). Other torques, voltages, and/or frequencies may be provided.

Other configurations of torque sensors may be provided. For example, FIGS. 17-21 illustrate a second example of a torque sensor 1700 that may generate torque data for use by the system control device 150, for example. The torque sensor 1700 of FIGS. 17-21 differs from the torque sensor 306 shown in FIGS. 3-6 in that the excitation coil 1702 and the sense coils 1704 are each formed in a printed circuit board (PCB). The excitation coil 1702 and the sense coils 1704 are disposed around the output ring 300. In other words, the torque sensor 1700 does not include a support (e.g., a bobbin) separate from, for example, substrates of the PCBs.

Figure 21:
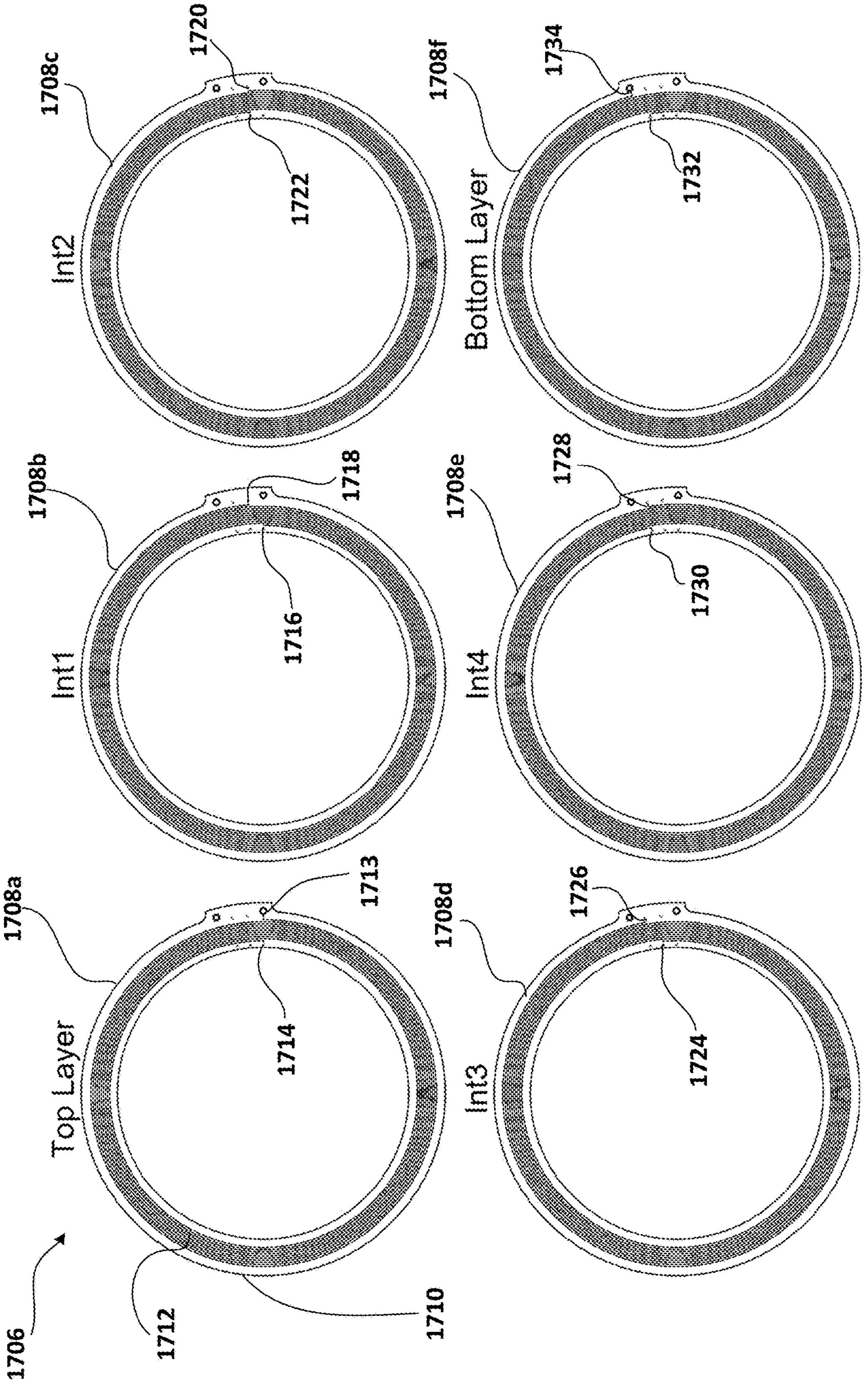
FIG. 21 is an exploded view of a coil of the torque sensor of FIG. 18.

Referring to FIG. 21, each of the PCBs includes any number of layers 1708. For example, the PCB 1706 shown in FIG. 21 includes six layers 1708*a-f* Each of the six layers 1708 *a-f* is cylindrically shaped and includes a substrate 1710 and one or more traces 1712 (e.g., a copper trace) disposed on one side of the substrate 1710. For example, each of the six layers 1708 *a-f* includes a continuous trace 1712 that wraps around the cylindrically shaped substrate 1710 a number of times (e.g., eight or ten times) to form windings of the respective coil 1702, 1704. Each of the six layers 1708*a-f* may have a same number of windings, and each of the coils 1702, 1704 may have a same number of windings. Other configurations may be provided.

The trace 1712 of a first of the six layers 1708*a* is wound from an input 1713 of the respective coil 1702, 1704 inward to a first via 1714 of the first layer 1708*a*. When the six layers 1708 are stacked to form the respective coil 1702, 1704, the first via 1714 of the first layer 1708*a* is in communication with a first via 1716 of a second of the six layers 1708*b*. The trace 1712 of the second layer 1708*b* is wound from the first via 1716 outward to a second via 1718 of the second layer 1708*b*. When the six layers 1708 are stacked, the second via 1718 of the second layer 1708*b* is in communication with a second via 1720 of a third of the six layers 1708*c*. The trace 1712 of the third layer 1708*c* is wound from the second via 1720 of the third layer 1708*c* inward to a third via 1722 of the third layer 1708*c*. When the six layers 1708 are stacked, the third via 1722 of the third layer 1708*c* is in communication with a third via 1724 of a fourth of the six layers 1708*d*. The trace 1712 of the fourth layer 1708*d* is wound from the third via 1724 of the fourth layer 1708*d* outward to a fourth via 1726 of the fourth layer 1708*d*. When the six layers 1708 are stacked, the fourth via 1726 of the fourth layer 1708*d* is in communication with a fourth via 1728 of a fifth of the six layers 1708*e*. The trace 1712 of the fifth layer 1708*e* is wound from the fourth via 1728 of the fifth layer 1708*e* inward to a fifth via 1730 of the fifth layer 1708*e*. When the six layers 1708 are stacked, the fifth via 1730 of the fifth layer 1708*e* is in communication with a fifth via 1732 of a sixth of the six layers 1708*f* The trace 1712 of the sixth layer 1708*f* is wound from the fifth via 1732 of the sixth layer 1708*f* outward to an output 1734 of the respective coil 1702, 1704. Other configurations may be provided.

Figure 22:
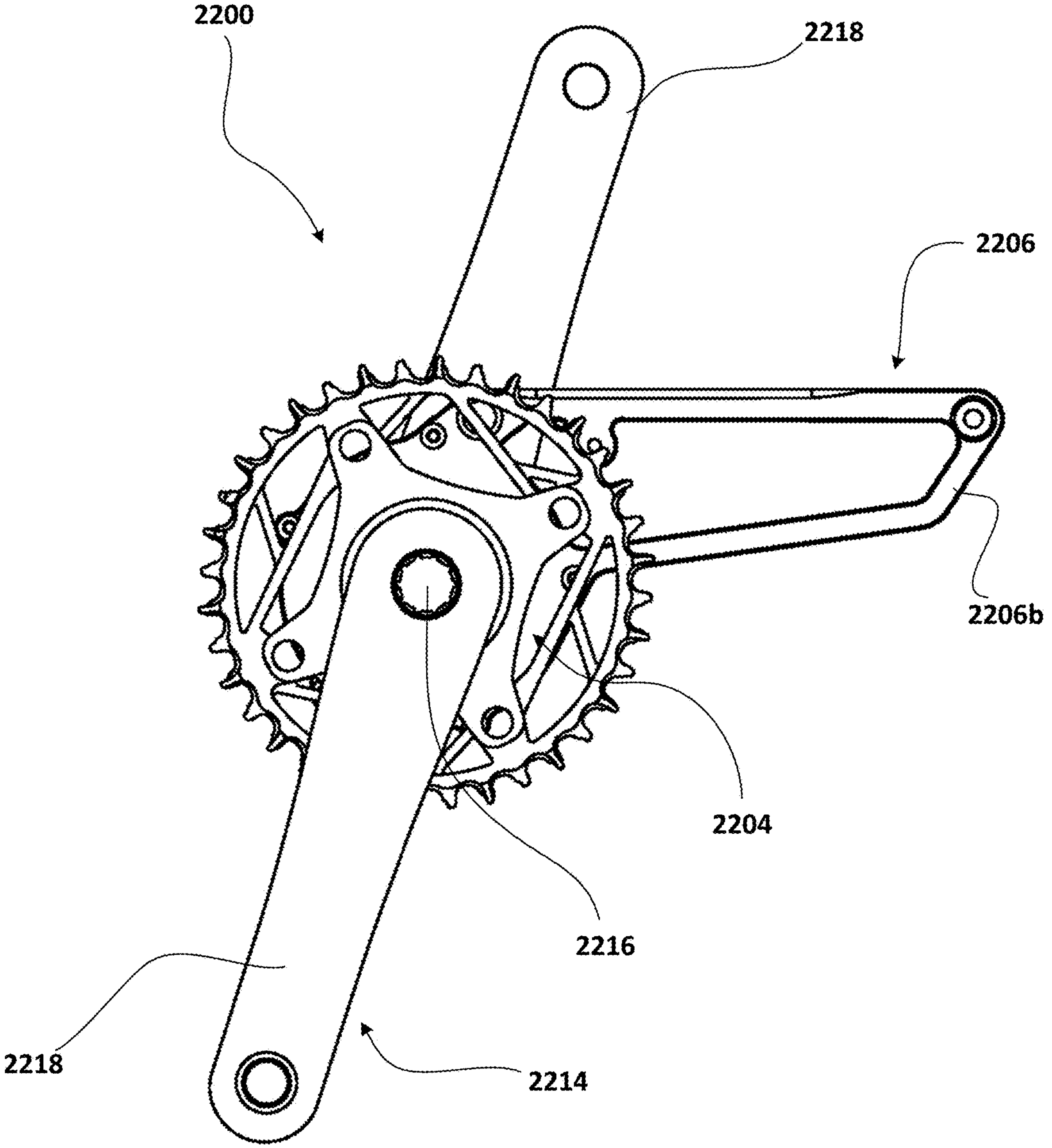
FIG. 22 is a front view of a first embodiment of a drive system of a bicycle including a third embodiment of a torque sensor.
Figure 23:
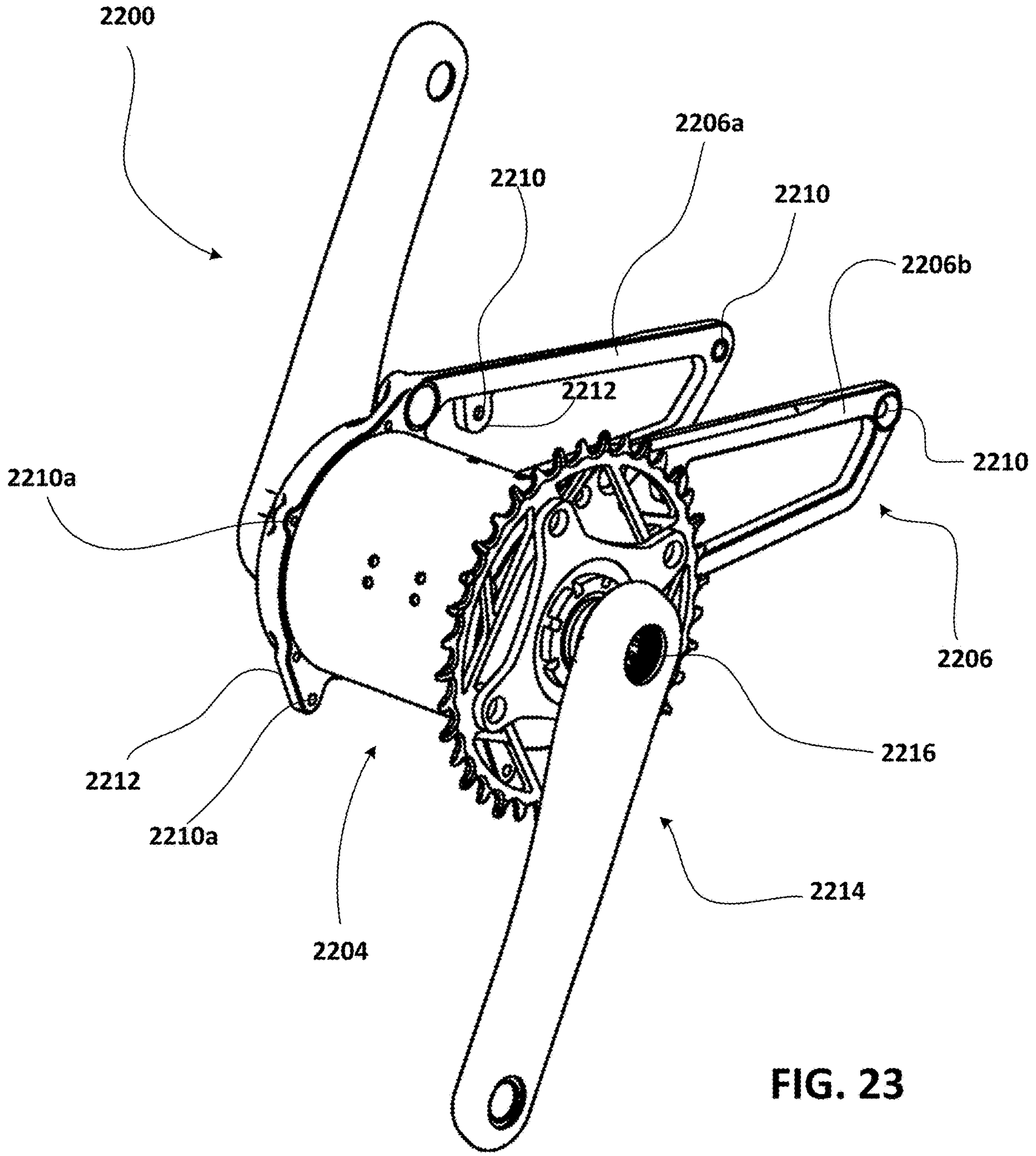
FIG. 23 is a perspective view of the drive system of FIG. 22.
Figure 24:
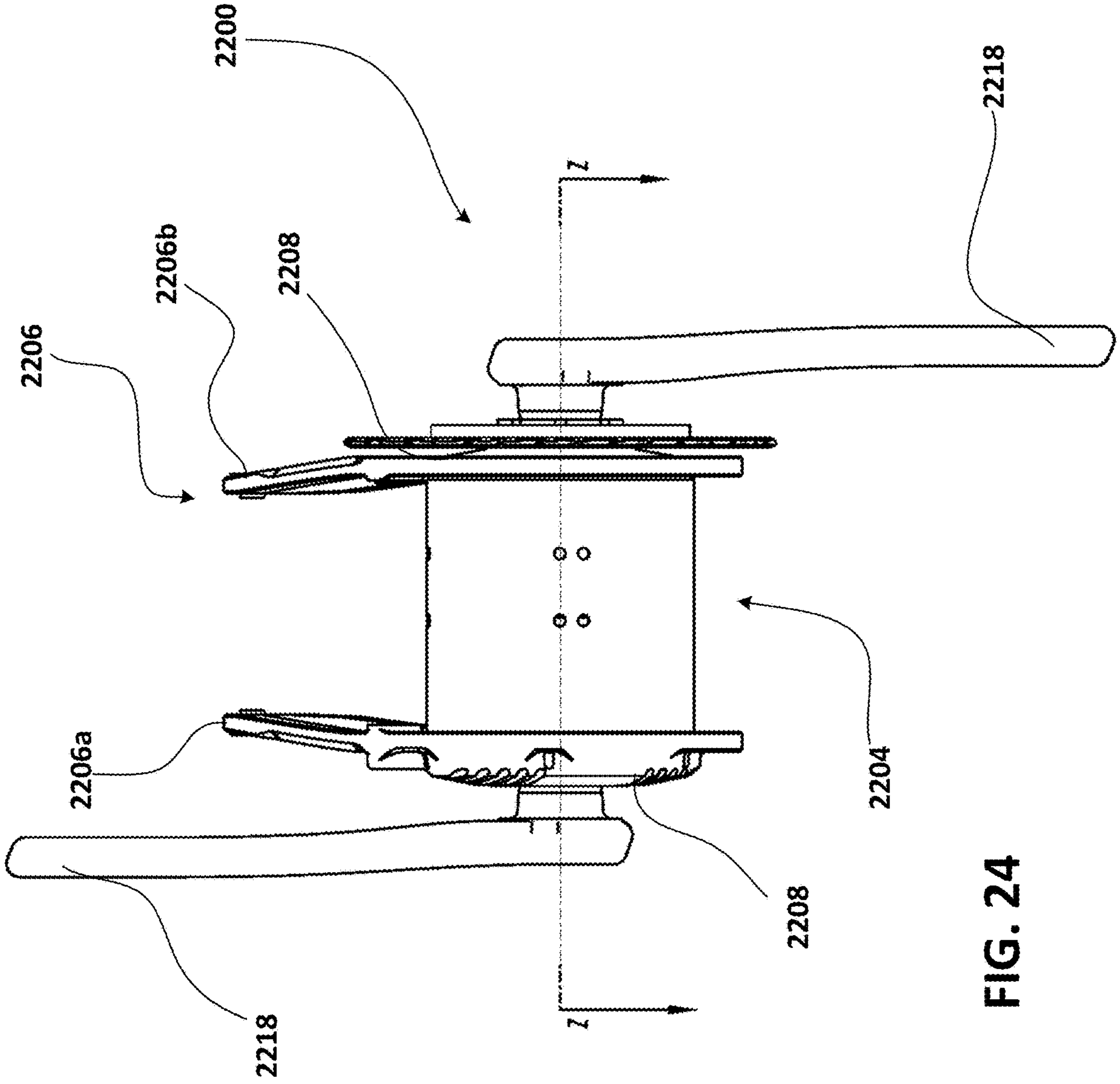
FIG. 24 is a top view of the drive system of FIG. 22.

FIGS. 22-31 illustrate a drive system 2200 that includes a third example of a torque sensor 2202 that may generate torque data for use by the system control device 150, for example. Referring to FIGS. 22-24, the drive system 2200 includes a drive unit 2204 that is mountable to a frame of a bicycle (e.g., the frame 102 of the bicycle 100). For example, the drive unit 2204 may be mounted to the frame of the bicycle via a support structure 2206 (e.g., frame portions) of the drive system 2200.

Referring to FIG. 23, the support structure 2206 may include a first support 2206*a* and a second support 2206*b*. The first support 2206*a* and the second support 2206*b* may support the drive unit 2204 on opposite sides of the drive unit 2204, respectively. Referring to FIG. 24, the first support 2206*a* and the second support 2206*b* of the support structure 2206 may include recessed portions 2208 (e.g., cylindrical recessed portions) into which the opposite sides of the drive unit 2204 are positionable, respectively.

Referring to FIGS. 22 and 23, the first support 2206*a* and the second support 2206*b* may be attached to the frame of the bicycle when the opposite sides of the drive unit 2204 are disposed within the cylindrical recessed portions 2208 of the first support 2206*a* and the second support 2206*b*, respectively, such that the drive unit 2204 is captive within the support structure 2206, and the support structure 2206 is attached to the bicycle. In one embodiment, the frame of the bicycle (e.g., the frame 102 of the bicycle 100) may include a hollow cylinder portion (e.g., a bottom bracket shell), through which the drive unit 2204 extends, and the first support 2206*a* and the second support 2206*b* are attached to opposite sides of the hollow cylinder portion of the frame of the bicycle. The support structure 2206 may be attached to the frame of the bicycle in any number of ways including, for example, with bolts and openings within the support structure 2206 and the frame of the bicycle.

Referring to FIG. 23, the support structure 2206 may include any number of openings 2210 through which bolts are extendable to attach the support structure 2206, and thus the drive unit 2204, to the frame of the bicycle via corresponding openings (e.g., threaded openings) in the frame of the bicycle. As shown in the example of FIG. 23, the first support 2206*a* and the second support 2206*b* may each include one or more openings 2210*a* adjacent to the respective cylindrical recessed portion 2208. The support structure 2206 may include any number of attachment features 2212 such as, for example, tabs, flanges, and extensions, through which one or more of the openings 2210 extend.

The drive unit 2204 may be attached to the frame of the bicycle in any number of other ways. For example, the support structure 2206 may be welded to the frame of the bicycle. Other attachment configurations may be provided.

Figure 25:
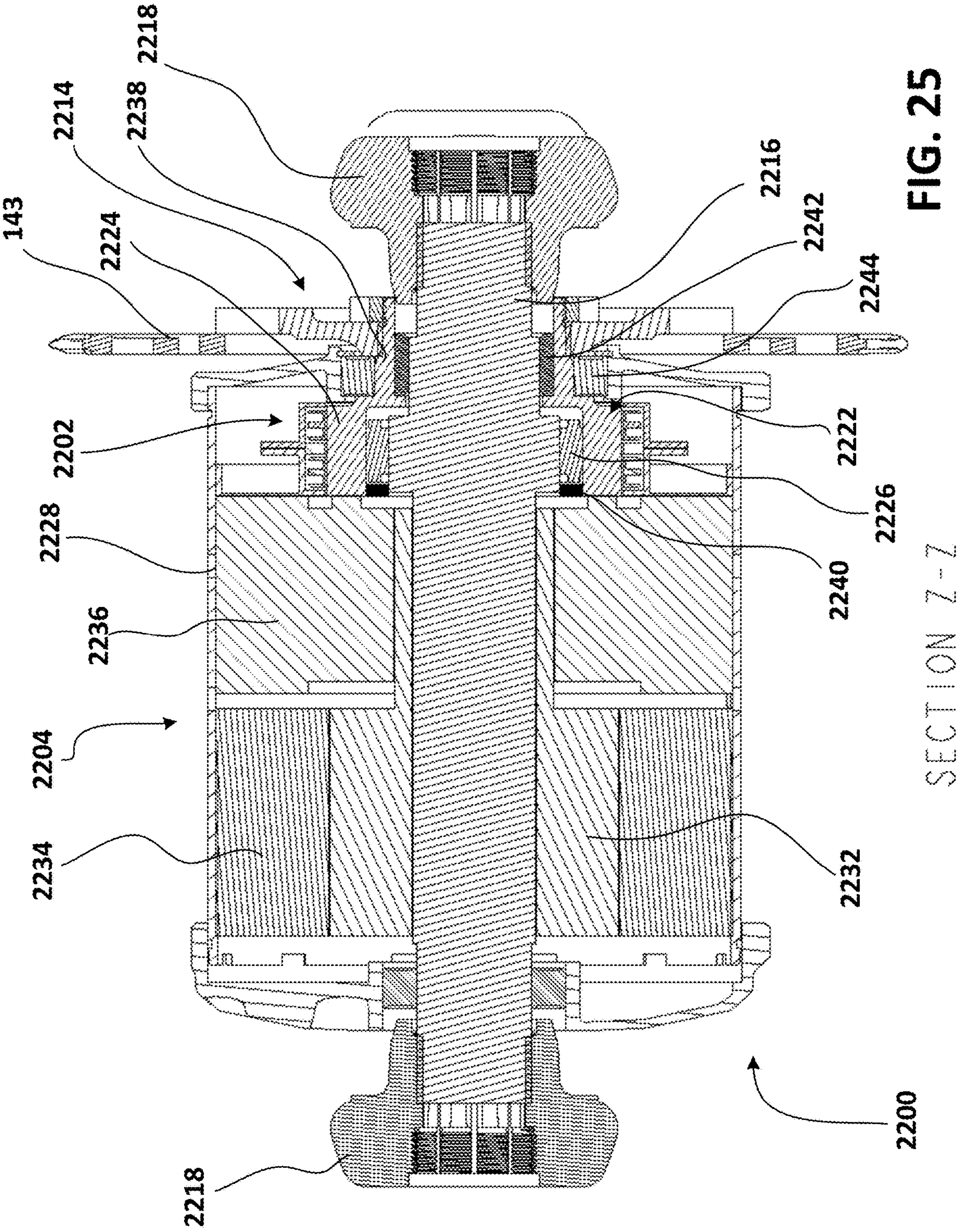
FIG. 25 is a cross-section of the drive system of FIG. 22.

Referring to FIGS. 22 and 25, the drive system 2200 also includes a crank assembly 2214. The crank assembly 2214 includes a crank axle 2216 (e.g., a crank shaft) that runs through an opening through the drive unit 2204 and connects two cranks 2218 of the crank assembly 2214 on opposite sides of the crank shaft 2216. During operation, the rider rotates the two cranks 2218 via two pedals attached to the two cranks 2218, respectively, rotating the crank shaft 2216.

Referring to FIG. 25, the crank assembly 2214 and/or the drive unit 2204 may include the torque sensor 2202. The torque sensor 2202 may be disposed around the crank shaft 2216 (e.g., acting as an inner race of a clutch mechanism 2222 of the drive unit 2204) or an outer ring 2224 (e.g., output ring) of the clutch mechanism 2222. The crank shaft 2216 drives the output ring 2224 (e.g., a chainring output and motor input) of the drive unit 2204 in a forward drive direction but not in a back pedaling direction through the use of, for example, a one-way clutch mechanism 2226 (e.g., a sprag type rotary clutch mechanism) between the crank shaft 2216 and the output ring 2224.

Referring to FIG. 25, the torque sensor 2202 may be disposed around the output ring 2224 of the clutch mechanism 2222, axially in line with the sprag type rotary clutch mechanism 2226. The drive unit 2204 includes a housing 2228 that supports and/or encloses components of the drive system 2200. The torque sensor 2202 may be attached to the housing 2228 of the drive unit 2204, such that the torque sensor 2202 is stationary (e.g., positionally fixed) relative to the housing 2228 of the drive unit 2204. The torque sensor 2202 may be attached to the housing 2228 of the drive unit 2204, such that the torque sensor 2202 and the output ring 2224 of the clutch mechanism 2222 are separated by a radial gap 2230 (see FIGS. 29 and 30).

The torque sensor 2202 may be attached to the housing 2228 of the drive unit 2204 in any number of ways. For example, the torque sensor 2202 may be attached to the housing 2228 of the drive unit 2204 using one or more fasteners (e.g., one or more screws or bolts through threaded holes). Other attachment configurations of the torque sensor 2202 within the drive unit 2204 may be provided.

The drive unit 2204 may include more or additional components. For example, referring to FIG. 25, the housing 2228 of the drive unit 2204 may house a rotor 2232 that rotates with the crank shaft 2216, and a stator 2234 supported by to the housing 2228. The stator 2234 may drive the rotor 2232 attached to the crank shaft 2216. The drive unit 2204 may also include a speed reducer 2236 (e.g., including one or more gears) coupled to the output ring 2224. The output ring 2224 may be, for example, a chainring shaft 2238 (e.g., the chainring 143 of the crank assembly 118). The drive unit 2204 may include bearings and/or bushing. For example, the drive unit 2204 may include a bushing 2240 for the sprag type rotary clutch mechanism 2226, a bushing 2242 for the crank shaft 2216, and a bearing 2244 for the chainring shaft 2238. Additional, fewer, and/or different bushings and/or bearings may be provided. The drive unit 2204 may include more, fewer, and/or different components.

Figure 29:
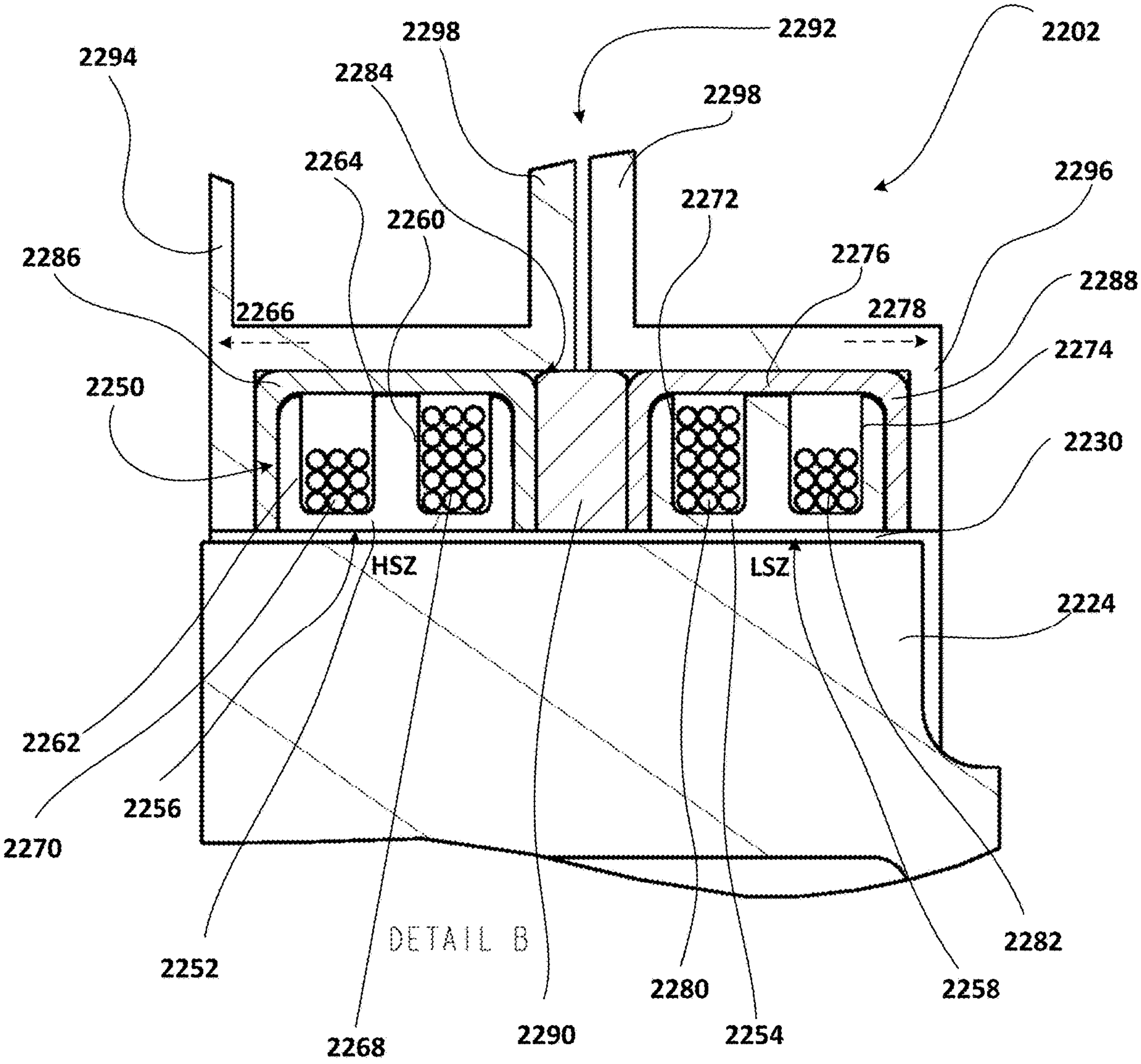
FIG. 29 is a first close-up of the cross-section of the portion of the drive unit of FIG. 28 showing the third embodiment of the torque sensor.
Figure 30:
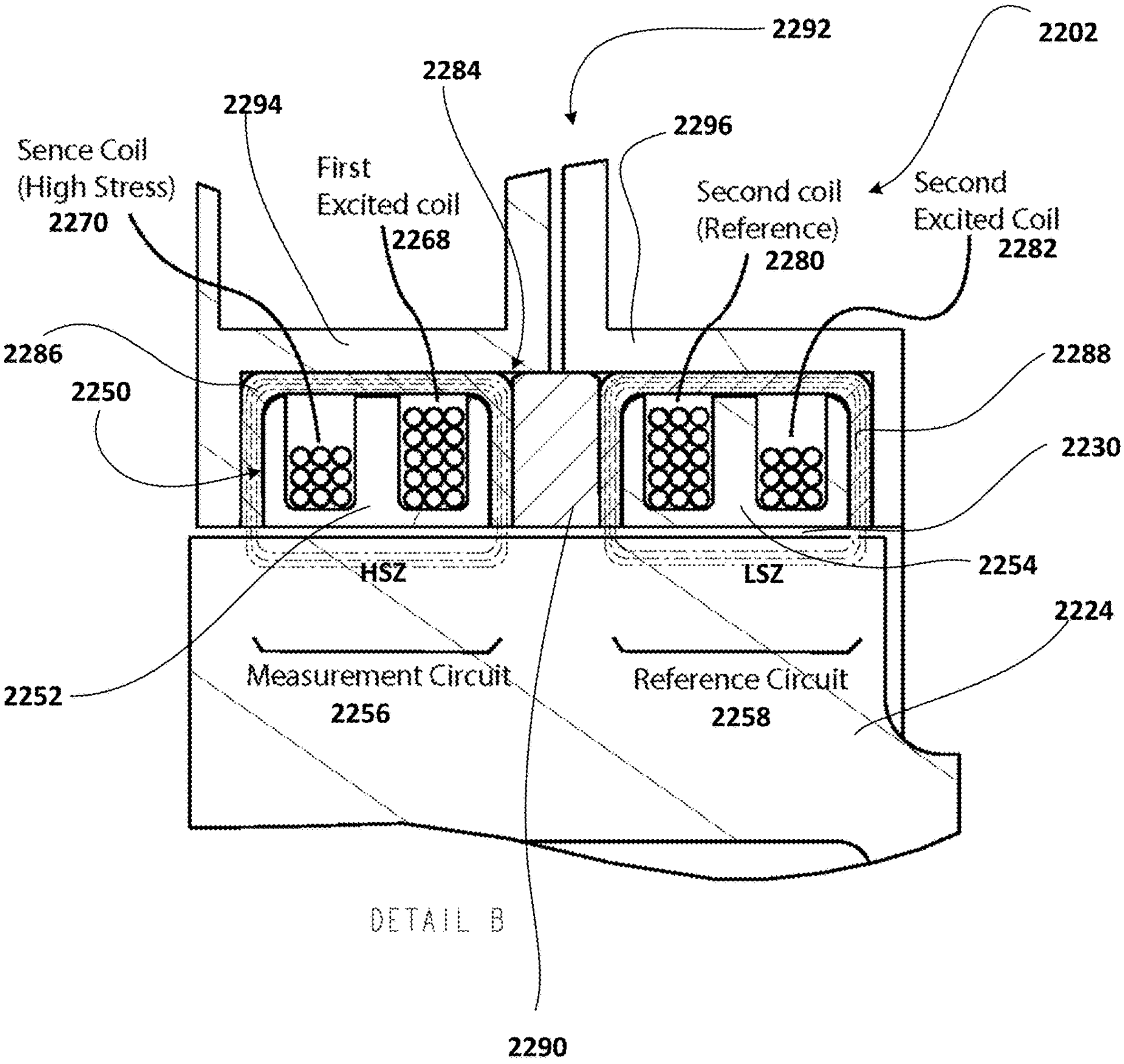
FIG. 30 is a second close-up of the cross-section of the portion of the drive unit of FIG. 28 showing the third embodiment of the torque sensor.

Referring to FIGS. 29 and 30, the torque sensor 2202 includes a support 2250 (e.g., a housing). The support 2250 includes, for example, a first support 2252 (e.g., a first part of the support 2250) and a second support 2254 (e.g., a second part of the support 2250). The first support 2252 and the second support 2254 may be separate from each other in, for example, an axial direction of the support 2250. Each of the first support 2252 and the second support 2254 may be configured as, for example, hollow cylinders (e.g., coil carriers, bobbins), but other configurations may be provided. In one embodiment, the first support 2252 and the second support 2254 are connected to each other. The first support 2252 and the second support 2254 may be made of any number of materials including, for example, a plastic. The first support 2252 and/or the second support 2254 may be made of a different material.

The torque sensor 2202 includes a first magnetic circuit 2256 (e.g., a measurement circuit) and a second magnetic circuit 2258 (e.g., a reference circuit). The first support 2252 supports (e.g., houses) the first magnetic circuit 2256, and the second support 2254 supports (e.g., houses) the second magnetic circuit 2258. For example, the first support 2252 includes a first groove 2260 and a second groove 2262 that extend into the first support 2252 and circumferentially around an outer side 2264 of the first support 2252. The second groove 2262 is offset relative to the first groove 2260 in a first axial direction 2266 of the torque sensor 2202.

The first magnetic circuit 2256 includes a first excitation coil 2268 and a first sense coil 2270 disposed within the first groove 2260 and the second groove 2262, respectively. In one embodiment, the first excitation coil 2268 is disposed within the second groove 2262, and the first sense coil 2270 is disposed within the first groove 2260.

The first excitation coil 2268 may be made of any number of materials. For example, the first excitation coil 2268 may be made of magnet wire (e.g., copper or aluminum magnet wire). The magnet wire of the first excitation coil 2268, for example, may be wound around the first support 2252, within the first groove 2260, for example, any number of times to form the first excitation coil 2268. For example, the magnet wire of the first excitation coil 2268 may be wound around the first support 2252 50 times (e.g., 50 turns) to form the first excitation coil 2268. In other embodiments, the magnet wire of the first excitation coil 2268 is wound around the first support 2252 more or fewer times to form the first excitation coil 2268.

The first sense coil 2270 may be made of any number of materials. For example, the first sense coil 2270 may be made of magnet wire (e.g., copper or aluminum magnet wire). Magnet wire, for example, may be wound around the first support 2252, within the second groove 2262 any number of times to form the first sense coil 2270. For example, the magnet wire of the first sense coil 2270 may be wound around the first support 2252 50 times (e.g., 50 turns) to form the first sense coil 2270. In other embodiments, the magnet wire is wound around the first support 2252 more or fewer times to form the first sense coil 2270. In one embodiment, the first sense coil 2270 has a different number of turns (e.g., 60 turns) than the first excitation coil 2268 (e.g., 50 turns). Varying a ratio of turns in the first excitation coil 2268 to turns in the first sense coil 2270 allows for varying signal gain.

When a rider applies torque to the crank shaft 2216 through the pedals and the sprag type rotary clutch mechanism 2226, radial stress is applied to the crank shaft 2216. The crank shaft 2216 may be made of a magnetostrictive material having a magnetic reluctance that changes as a function of an amount of physical deformation experienced by the crank shaft 2216. The torque sensor 2202 may be positioned relative to the crank shaft 2216 and a physical geometry of the crank shaft 2216 may be optimized so as to create a high stress zone (HSZ) between, for example, the first excitation coil 2268 and the first sense coil 2270. The HSZ experiences higher stress than in other parts of an outer surface of the crank shaft 2216, making the torque applied by the rider easier to measure.

Magnetic permeability of many materials may be temperature dependent, so that as the drive unit 2204 begins to heat up from use or cool from other factors, a zero-torque point (ZTP) may drift. A stable torque measurement over time may be difficult to obtain with such drift.

The second support 2254 includes a third groove 2272 and a fourth groove 2274 that extend into the second support 2254 and circumferentially around an outer side 2276 of the second support 2254. The third groove 2272 is offset relative to the first groove 2260 in a second axial direction 2278 of the torque sensor 2202. The second axial direction 2278 of the torque sensor 2202 is opposite the first axial direction 2266 of the torque sensor 2202. The fourth groove 2274 is offset relative to the third groove 2272 in the second axial direction 2278 of the torque sensor 2202 or the first axial direction 2266 of the torque sensor 2202 (e.g., the second axial direction 2278 of the torque sensor 2202).

The second magnetic circuit 2258 includes a second sense coil 2280 and a second excitation coil 2282 disposed within the third groove 2272 and the fourth groove 2274, respectively. In one embodiment, the second sense coil 2280 is disposed within the fourth groove 2274, and the second excitation coil 2282 is disposed within the third groove 2272.

The second excitation coil 2282 may be made of any number of materials. For example, the second excitation coil 2282 may be made of magnet wire (e.g., copper or aluminum magnet wire). The magnet wire of the second excitation coil 2282, for example, may be wound around the second support 2254, within the fourth groove 2260, for example, any number of times to form the second excitation coil 2282. For example, the magnet wire of the second excitation coil 2282 may be wound around the second support 2254 50 times (e.g., 50 turns) to form the second excitation coil 2282. In other embodiments, the magnet wire of the second excitation coil 2282 is wound around the second support 2254 more or fewer times to form the second excitation coil 2282.

The second sense coils 2280 may be made of any number of materials. For example, the second sense coil 2280 may be made of magnet wire (e.g., copper or aluminum magnet wire). Magnet wire, for example, may be wound around the second support 2254, within the third groove 2272 any number of times to form the second sense coil 2280. For example, the magnet wire of the second sense coil 2280 may be wound around the second support 2254 50 times (e.g., 50 turns) to form the second sense coil 2280. In other embodiments, the magnet wire is wound around the second support 2254 more or fewer times to form the second sense coil 2280. In one embodiment, the second sense coil 2280 has a different number of turns (e.g., 60 turns) than the second excitation coil 2282 (e.g., 50 turns). Varying a ratio of turns in the second excitation coil 2282 to turns in the second sense coil 2280 allows for varying signal gain.

In one embodiment, the support 2250 is a single support with the first groove 2260, the second groove 2262, and the third groove 2272 extending into and circumferentially around the support. In such an embodiment, the first excitation coil 2268 may be disposed within the first groove 2260, the first sense coil 2270 may be disposed within the second groove 2262, and the second sense coil 2280 may be disposed within the third groove 2272.

The torque sensor 2202 is positioned relative to the crank shaft 2216, such that a low stress zone (LSZ) (e.g., relative to the HSZ) is positioned between the second sense coil 2280 and an excitation coil of the torque sensor 2202 (e.g., the second excitation coil 2282). In the LSZ of the crank shaft 2216, a relative change of the magnetic reluctance may be orders of magnitude lower than in the HSZ. This provides a stable reference of where the ZTP is over temperature. As materials in the torque sensor heat or cool at a similar rate to each other, the permeability of the first magnetic circuit 2256 and the permeability of the second magnetic circuit 2258 change at a similar rate and in a same direction. A processor of the torque sensor 2202 or outside the torque sensor (e.g., of the bicycle 100) may generate the torque data for use by the system control device 150, for example, based on a difference of amplitudes between signals of the first sense coil 2270 and the second sense coil 2280, respectively (e.g., calculated by the processor).

Referring to FIGS. 29 and 30, the torque sensor 2202 includes an inner shield 2284 (e.g., a first shield) that covers at least part of the support 2250. In the embodiment shown in FIGS. 29 and 30, for example, the inner shield 2284 includes a first inner shield 2286, a second inner shield 2288 separate from the first inner shield 2286, and a spacer 2290 that is disposed between the first support 2252 and the second support 2254. The spacer 2290 thus separates the first support 2252 and the second support 2254, and thus the first magnetic circuit 2256 and the second magnetic circuit 2258. In such an embodiment, the first inner shield 2286 covers at least part of the first support 2252 (e.g., at least an outer circumferential surface and an outer end of the first support 2252), and the second inner shield 2288 covers at least part of the second support 2254 (e.g., at least an outer circumferential surface and an outer end of the second support 2254). For example, the first inner shield 2286 covers at least the first groove 2260 and the second groove 2262 in the first support 2252, and the second inner shield 2288 covers at least the third groove 2272 and the fourth groove 2274 in the second support 2254. Thus, the first inner shield 2286 encloses the first excitation coil 2268 and the first sense coil 2270 within the first support 2252, and the second inner shield 2288 encloses the second excitation coil 2282 and the second sense coil 2280 within the second support 2254.

The inner shield 2284 helps provide a closed magnetic circuit by adding return paths of a highly ferromagnetic material (e.g., low reluctance return paths) to direct lines of magnetic flux. Adding the low reluctance return paths greatly increases flux flowing in the first magnetic circuit 2256 and the second magnetic circuit 2258, respectively, and coupling, both of which contribute to increased sensing amplitude and thus increased measurement sensitivity.

The inner shield 2284 (e.g., the first inner shield 2286 and the second inner shield 2288) may be made of any number of materials (e.g., a first shield material). For example, the first inner shield 2286 and the second inner shield 2288 may be made of a same material, such as, for example, a material with a high magnetic permeability and a low electrical conductivity (e.g., a ferrite). In one embodiment, different ferrites are used for the first inner shield 2286 and the second inner shield 2288, respectively. The spacer 2290 may be made of any number of different materials. For example, the spacer 2290 may be made of the same material as the first inner shield 2286 and the second inner shield 2288 (e.g., the first shield material). In one embodiment, the spacer 2290 is made of a different material than the first inner shield 2286 and/or the second inner shield 2288. For example, the spacer 2290 may be made of a plastic.

The permeability of the first shield material may be as high as possible to provide a lowest reluctance path possible for the magnetic flux. When AC magnetic fields enter a good electrical conductor, eddy currents are generated. A magnetic field of the eddy currents is opposite an applied field (e.g., generated by the first excitations coil 2268 and/or the second excitation coil 2282), thus dampening the applied field. Accordingly, the field shield material may have a low electrical conductivity.

In one embodiment, the inner shield 2284 is a single part that covers at least part of the support 2250. In one embodiment, the inner shield 2284 covers at least part of the first support 2252 and at least part of the second support 2254. Such an inner shield 2284 separates the second support 2254 from the first support 2252, and thus the second magnetic circuit 2258 from the first magnetic circuit 2256. A cross-section of such an inner shield 2284 may have a comb-like structure. In another embodiment, in which the support 2250 is a single part that supports the first excitation coil 2268, the first sense coil 2270, and the second sense coil 2280, the inner shield 2284 is a single part that coves at least part of the support 2250 and encloses the first excitation coil 2268, the first sense coil 2270, and the second sense coil 2280 within the torque sensor 2202.

The first magnetic circuit 2256 causes flux to pass through the HSZ, and the second magnetic circuit 2258 causes flux to pass through the LSZ. Chambers of the first magnetic circuit 2256 and the second magnetic circuit 2258 (e.g., two chambers) are isolated from each other (e.g., by the spacer 2290), and the measurement sensitivity is thus increased while the measurement error is reduced.

Some of the magnetic flux, traveling in loops, cross both the HSZ and the LSZ. This may cause a measurement signal (e.g., from the first sense coil 2270) and a reference signal (e.g., from the second sense coil 2280) to be correlated, which decreases measurement sensitivity and makes the reference signal change more with applied rider torque.

Referring to FIGS. 29 and 30, the torque sensor 2202 may also include an outer shield 2292 (e.g., a second shield) that covers at least part of the inner shield 2284 (e.g., the first inner shield 2286, the second inner shield 2288, and the spacer 2290). For example, the outer shield 2292 may cover an outer circumferential surface and outer ends of the inner shield 2284. In the embodiment shown, the outer shield 2292 includes a first outer shield 2294 and a second outer shield 2296. The first outer shield 2294 may be integral with the housing 2228 or may be attached to the housing 2228 in any number of ways including, for example, with one or more fasteners (e.g., one or more bolts through one or more holes through the first outer shield 2294 and one or more holes, such as tapped holes, in the housing 2228). The torque sensor 2202 may thus be attached to the housing 2228 via the attachment of the first outer shield 2294, for example, to the housing 2228. The first outer shield 2294 may cover a first part of the inner shield 2284 including, for example, an outer circumferential surface and an outer end of the first inner shield 2286, and a first part of an outer circumferential surface of the spacer 2290.

The second outer shield 2296 may cover a second part of the inner shield 2284 including, for example, an outer circumferential surface and an outer end of the second inner shield 2288, and a second part of an outer circumferential surface of the spacer 2290. The second outer shield 2296 may be attached to the first outer shield 2294 to form the outer shield 2292. For example, the second outer shield 2296 may be attached to the first outer shield 2294 with one or more fasteners (e.g., one or more bolts through one or more holes through the first outer shield 2294 and one or more holes through the second outer shield 2296, respectively), an adhesive, a weld, and/or another attachment configuration. The first outer shield 2294 and the second outer shield 2296 each include flanges 2298, respectively, via which the first outer shield 2294 and the second outer shield 2296 may be attached to each other. Holes 2299 (see FIG. 26) through the first outer shield 2294 and the second outer shield 2296, respectively, via which the first outer shield 2294 and the second outer shield 2296 may be attached to each other with bolts, may extend through the flanges 2298, respectively.

The outer shield 2292 (e.g., the first outer shield 2294 and the second outer shield 2296) may be made of any number of materials (e.g., a second shield material). For example, the first outer shield 2294 and the second outer shield 2296 may be made of a same material, such as, for example, a non-ferromagnetic (e.g., a permeability of 1), electrically conductive material. Such a non-ferromagnetic, electrically conductive material may be, for example, Aluminum 7075, though other materials may be used. In one embodiment, different non-ferromagnetic, electrically conductive materials are used for the first outer shield 2296 and the second outer shield 2298, respectively.

With the outer shield 2294 included within the torque sensor 2202, as the torque sensor 2202 experiences small axial movement within the dynamic system of the drive unit 2204, an impedance that coils of the torque sensor 2202 (e.g., the first excitation coil 2268, the second excitation coil 2282, the first sense coil 2270, and the second sense coil 2280) see may not change; thus, amplitude change of the measured signals may be minimized. This increases the reliability of the torque sensor 2202 and keeps magnetic fields of the torque sensor 2202 almost completely contained. Further, this increases symmetry of the first sense coil 2270 and the second sense coil 2280, which helps minimize measurement errors.

Components of the torque sensor 2202 (e.g., the support 2250, the first excitation coil 2268, the first sense coil 2270, the second sense coil 2280, the second excitation coil 2282, and the inner shield 2284) may be kept within the torque sensor 2202 via a friction fit provided by the attachment of the second outer shield 2296 to the first outer shield 2294. For example, the bolts used to attach the second outer shield 2296 to the first outer shield 2294 may be tightened while the components of the torque sensor 2202 are housed within the outer shield 2292 to apply axial pressure to the components of the torque sensor 2202 and prevent axial and/or radial movement of the components of the torque sensor 2202. The components of the torque sensor 2202 may thus be connected and positionally stationary relative to the housing 2228. The components of the torque sensor 2202 may be attached to the outer shield 2294 of the torque sensor 2202 and/or the housing 2228 in any number of other ways including, for example, with an adhesive.

In one embodiment, the outer shield 2294 is a single part that covers at least parts of both the first inner shield 2286 and the second inner shield 2288, and the spacer 2290, respectively. Such a single part outer shield 2294 may be integral with the housing 2228 or may be attached to the housing 2228 in any number of ways including, for example, with one or more fasteners into one or more openings (e.g., tapped openings) in the housing 2228, respectively.

Figure 26:
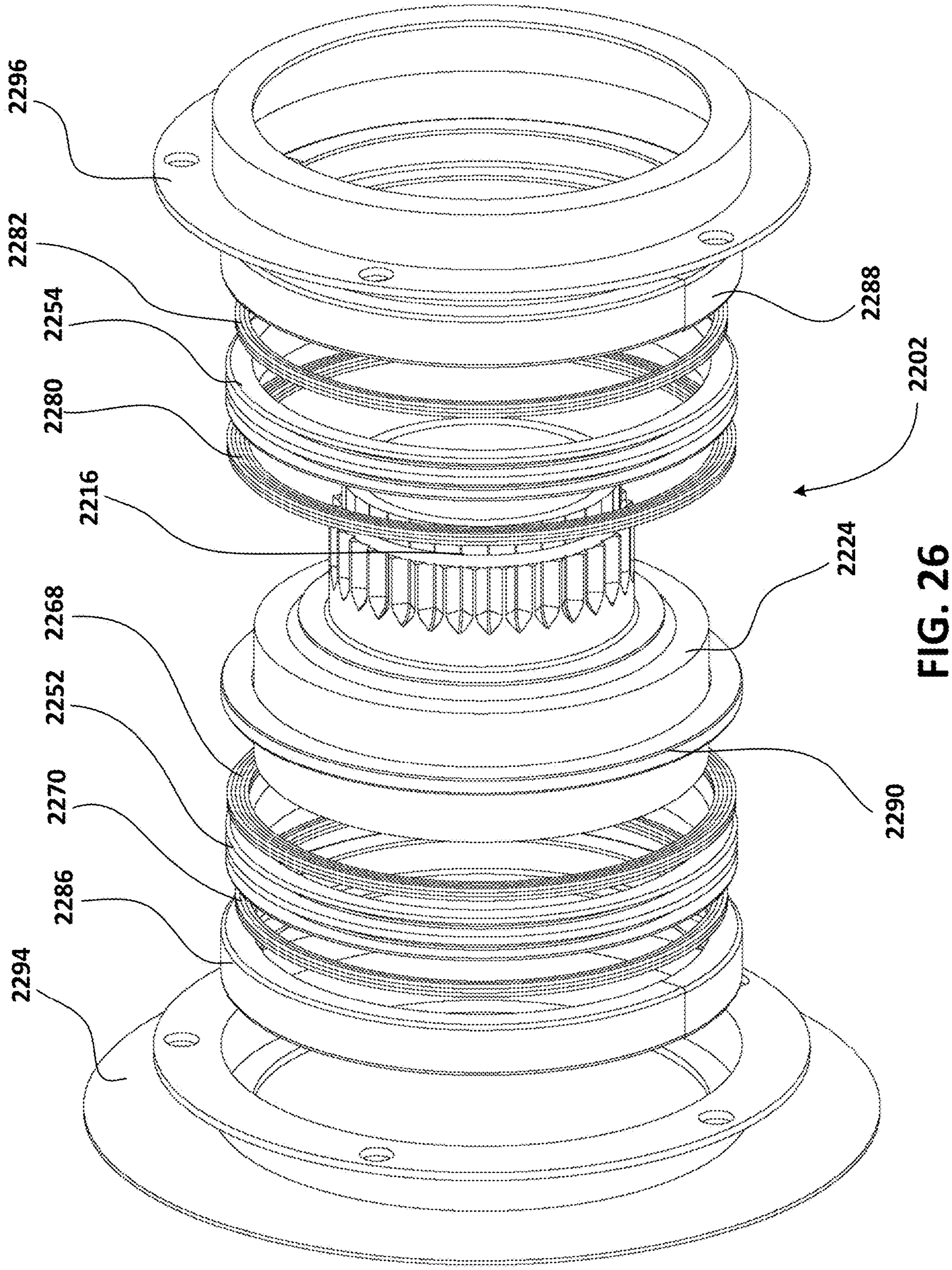
FIG. 26 is an exploded view of the third embodiment of the torque sensor.
Figure 27:
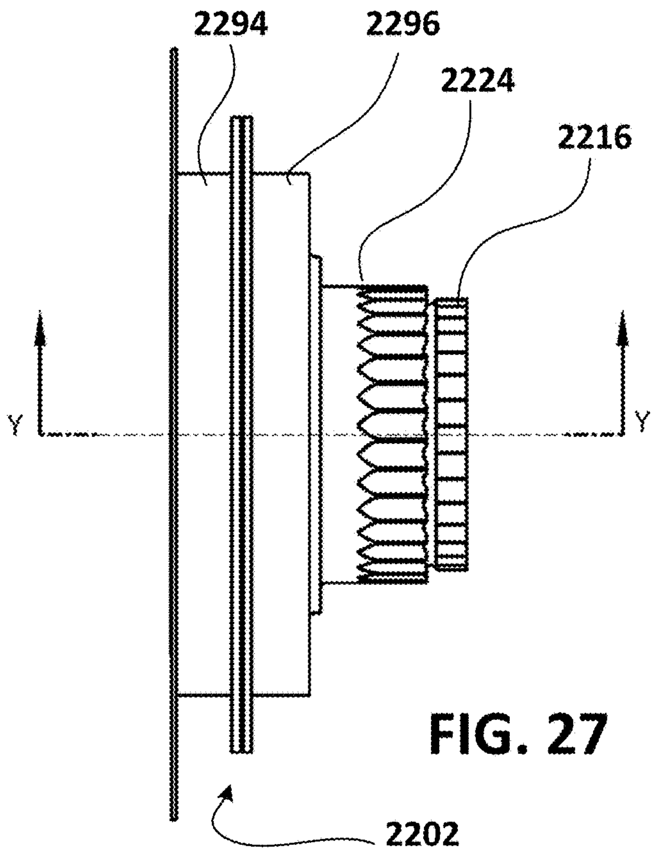
FIG. 27 is a close-up of a portion of an embodiment of a drive unit of the drive system of FIG. 22.
Figure 28:
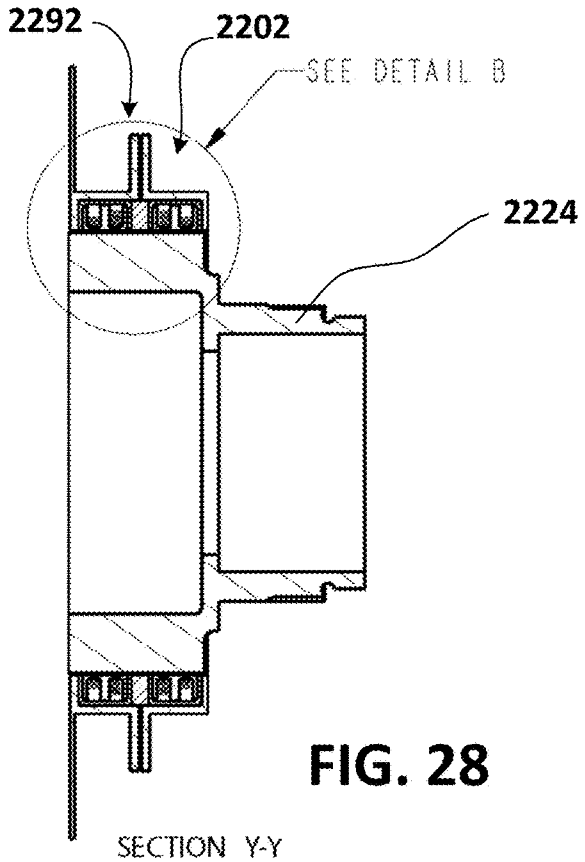
FIG. 28 is a cross-section of the portion of the drive unit of FIG. 27 showing the third embodiment of the torque sensor.

The components of the torque sensor 2202 and the outer shield 2294 of the torque sensor 2202 may be any number of shapes and/or sizes. Referring to FIG. 26, for example, the components of the torque sensor 2202 (e.g., the support 2250, including the first support 2252 and the second support 2254, the first excitation coil 2268, the first sense coil 2270, the second sense coil 2280, the second excitation coil 2282, the inner shield 2284, including the first inner shield 2286 and the second inner shield 2288, and the spacer 2290) and the outer shield 2294 of the torque sensor 2202, which houses the components of the torque sensor 2202, may be annular in shape. An inner diameter of the support 2250 may be sized, such that the torque sensor 2202 may be positioned around the output ring 2224 of the clutch mechanism 2222 with the radial gap 2230 between, for example, the support 2250 and the output ring 2224 of the clutch mechanism 2222.

By building two magnetic circuits that are similar or the same, the first magnetic circuit 2256 over the HSZ and the second magnetic circuit 2258 over the LSZ, a difference in strain between the HSZ and the LSZ may be isolated. A voltage applied to the first excitation coil 2268 and the second excitation coil 2282 induces signals (e.g., voltages) in the first sense coil 2270 and the second sense coil 2280, respectively. The processor of the torque sensor 2202 or the bicycle, for example, may receive signals (e.g., converted signals from ADCs) from the first sense coil 2270 and the second sense coil 2280, and determine a difference between the measured signals (e.g., a differential signal; differential voltage). The differential voltage varies with torque but may eliminate sensor offset or drift caused by thermal expansion of elements of the clutch mechanism 2222 and/or the torque sensor 2202. The processor may determine a reacted torque based on the differential voltage. For example, the reacted torque may be determined based on a predetermined function (e.g., determined experimentally) using the differential voltage as an input.

The torque sensor 2202 may include more, fewer, and/or different components. For example, the torque sensor 2202 may include a third shield that at least partially covers the second shield 2294. The third shield may, for example, shield against external, low-frequency magnetic fields. If external magnetic fields are not shielded properly, the external fields may leak into the torque sensor 2202 and cause measurement errors. The external fields may saturate the inner ferromagnetic return paths or may cause a permeability gradient between the two chambers, as permeability is dependent on field strength. The third shield may be made of any number of different materials including, for example, a ferromagnetic ceramic material (e.g., a ferrite), such that the third shield gives a source of the external magnetic field a low reluctance return path back to the source. The first shield 2284 may contain a high frequency field within the torque sensor 2202, the second shield 2294 may shield the torque sensor 2202 from high-frequency external fields, and the third shield may shield the torque sensor 2202 from low-frequency external fields. This may increase the reliability and practicality of the torque sensor 2202.

The torque sensor 2202 may be mounted to other rotationally stationary components of the drive unit 2204 (e.g., instead of the housing 2228). For example, referring to FIG. 31, the drive unit 2204 may include end caps 2300, 2302 on opposite ends 2304, 2306, respectively, of the housing 2228. The end caps 2300, 2302 may be attached to the housing 2228 of the drive unit 2204 at the opposite ends 2304, 2306 of the housing 2228 in any number of ways including, for example, via threaded connections, respectively. Other attachment configurations may be provided.

Figure 31:
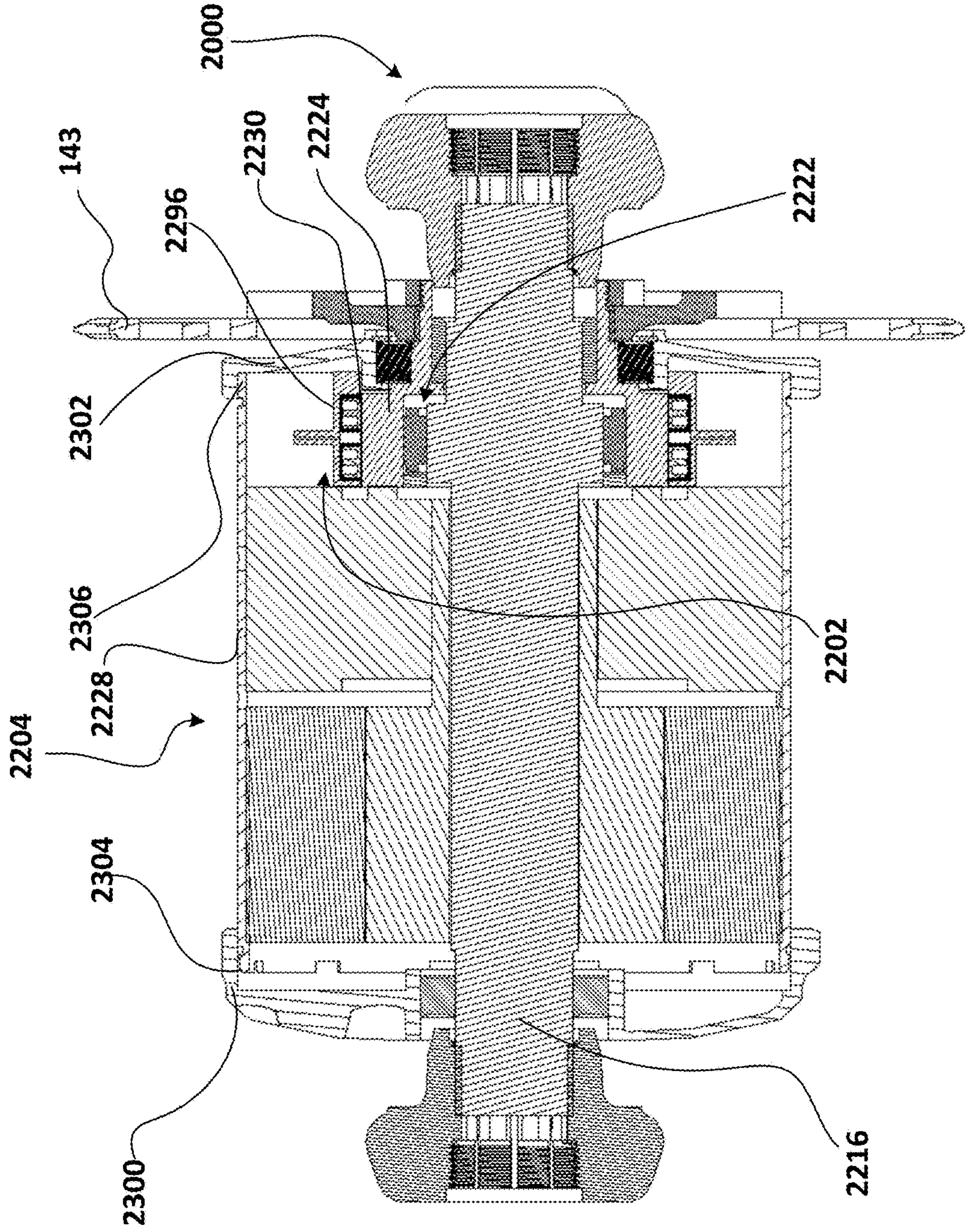
FIG. 31 is a cross-section of a second embodiment of a drive system of a bicycle including the third embodiment of the torque sensor.

As shown in the example of FIG. 31, the torque sensor 2202 may be attached to the end cap 2302 of the drive unit 2204 (e.g., via the second outer shield 2296), such that the torque sensor 2202 and the output ring 2224 of the clutch mechanism 2222 are separated by the radial gap 2230. The torque sensor 2202 may be attached to the end cap 2302 of the drive unit 2204 in any number of ways including, for example, with one or more fasteners.

Figure 32:
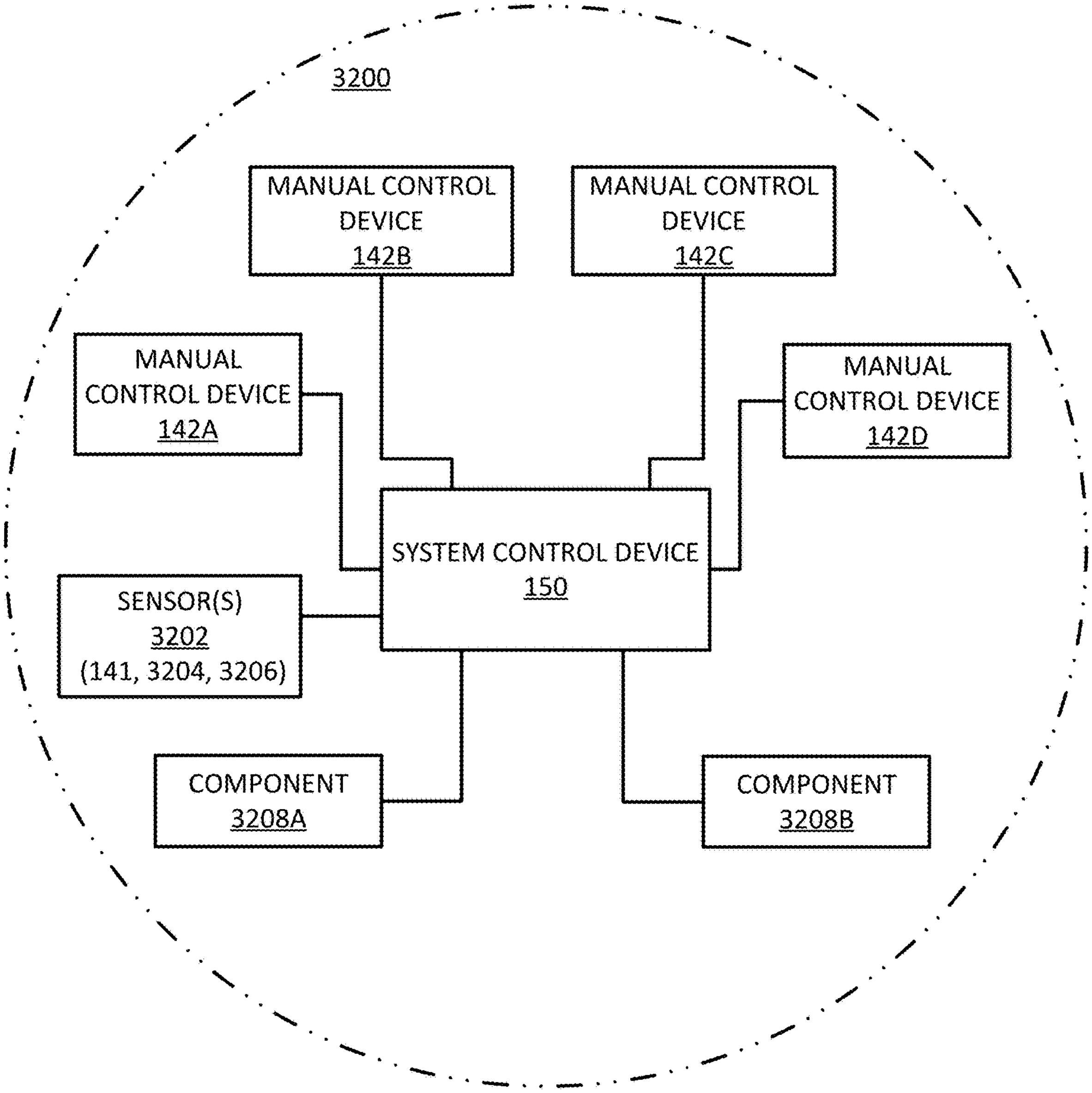
FIG. 32 is a block diagram of an exemplary bicycle control system for implementing methods of controlling a bicycle.

FIG. 32 illustrates a bicycle control system 3200 that includes multiple manual control devices 142A-D, a system control device 150, at least one sensor 3202, such as a sensor 141 (e.g., a torque sensor), a cadence sensor, and/or a speed sensor 3206, and bicycle components 3208A-B, such as a rear derailleur and/or a front derailleur, or one or more internal gear hubs. The manual control devices 142A-D are communicatively coupled with the system control device 150, such as by a cable or wirelessly, to communicate control signals to the system control device(s) 142. The system control device 150 is configured to communicate control signals responsive to the received control device signals, or resulting from automatic shifting determinations, to the component(s) 3208A-B. In an embodiment, the system control device 150 is configured to communicate the control signals wirelessly to one or multiple bicycle components 3208A-B. The control signals may be communicated wirelessly using any technique, protocol, or standard. For example, Institute of Electrical and Electronics Engineers ("IEEE") 802.11 standards, IEEE 802.15.1 or BLUETOOTH® standards, ANT™ or ANT+™ standards, and/or AIREA™ standards may be used. The bicycle components 3208A-B may be any bicycle component. For example, the components 3208A-B may be drive train components and/or suspension components. In an embodiment, a component 3208A may be a rear derailleur, and the other component 3208B may be a front derailleur. Other components may also be included. For example, the system control device 150 may be in communication with, or provide control signals for, three or more components, such as a front derailleur, a rear derailleur, and a front suspension system. Alternatively, the system control device 150 may only provide control signals for a single component 3208A. In an embodiment, the receiver may communicate control signals wirelessly with one component 3208A, and the one component 3208A may communicate the control signals to another component 3208B.

In an embodiment, the bicycle control system 3200 includes at least one manual control device 142 including a control mechanism for generating a control signal to control at least one bicycle component 3208A. The system control device 150 may be a standalone device, or may be integrated with one or more components 3208A-B.

Figure 33:
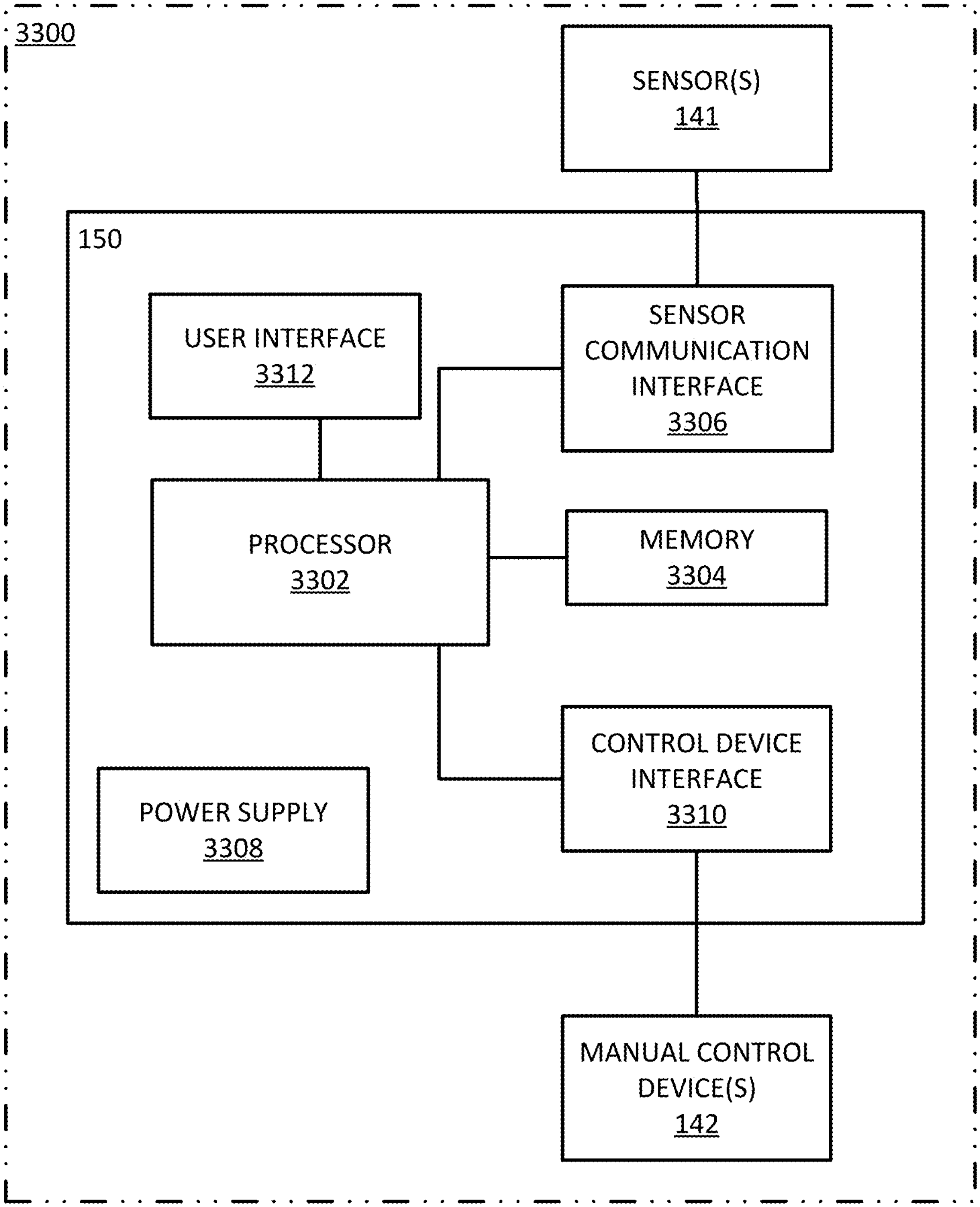
FIG. 33 is a block diagram of an exemplary control device for use in implementing methods of controlling a bicycle.

FIG. 33 is a block diagram of an exemplary control system 3300 for a bicycle that may be used to implement a system control device 150. The control system 3300 may be used alone to communicate with and control bicycle components, or the control system 3300 may be used in conjunction with at least one other control system for components of the bicycle, such as a primary control system that may include alternative control devices such as brake lever housing integrated shift controllers. The control system 3300 includes a system control device 150, one or more control devices 142, and/or one or more sensors 141. The system control device 150 includes a processor 3302, a memory 3304, a sensor communication interface 3306, a power supply 3308, and a control device interface 3310. Optionally, the system control device 150 may also include a user interface 3312. Additional, different, or fewer components are possible for the system control device 150.

The processor 3302 may include a general processor, digital signal processor, an application specific integrated circuit (ASIC), field programmable gate array (FPGA), analog circuit, digital circuit, combinations thereof, or other now known or later developed processor. The processor 3302 may be a single device or combinations of devices, such as through shared or parallel processing. In one embodiment, for example, a CPU 3302 used may be an Atmel® ATmega324PA microcontroller with an internal eeprom memory, and a transmitter and a receiver used may be an Atmel® AT86RF231 2.4 GHz transceiver utilizing AES encryption and DSS spread spectrum technology supporting 16 channels and the IEEE 802.15.4 communication protocol.

The memory 3304 may be a volatile memory or a non-volatile memory. The memory 3304 may include one or more of a read only memory (ROM), random access memory (RAM), a flash memory, an electronic erasable program read only memory (EEPROM), or other type of memory. The memory 3304 may be removable from the system control device 150, such as a secure digital (SD) memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The memory 3304 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding, or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The power supply 3308 is a portable power supply, which may be stored internal to the system control device 150, or stored external to the system control device 150 and communicated to the system control device 150 through a power conductive cable. The power supply 3308 may involve the generation of electric power, for example, using a mechanical power generator, a fuel cell device, photo-voltaic cells, or other power generating devices. The power supply 3308 may include a battery such as a device consisting of two or more electrochemical cells that convert stored chemical energy into electrical energy. The power supply 3308 may include a combination of multiple batteries or other power providing devices. Specially fitted or configured battery types, or standard battery types such as CR 2012, CR 2016, and/or CR 2032 may be used.

The control device interface 3310 provides for data communication from the control devices 142 to the system control device 150. The control device interface 3310 includes wired conductive signal and/or data communication circuitry operable to interpret signals provided by different control devices 142. For example, the control device interface 3310 may include a series of ports for receiving control device input cables. Each of the ports may be distinguishable by the processor 3302 through grouping tables or arrays, or through physical circuits or other circuitry that provide for grouping control device inputs. Alternatively, different control devices 142 may communicate with the system control device 150 wirelessly as is described herein.

The user interface 3312 may be one or more buttons, keypad, keyboard, mouse, stylus pen, trackball, rocker switch, touch pad, voice recognition circuit, or other device or component for communicating data between a user and the system control device 150. The user interface 3312 may be a touch screen, which may be capacitive or resistive. The user interface 3312 may include a liquid crystal display ("LCD") panel, light emitting diode (LED), LED screen, thin film transistor screen, or another type of display. The user interface 3312 may also include audio capabilities, or speakers. In an embodiment, the user interface is configured to provide a notice to a user that the system control device 150 has entered automatic mode, paused automatic mode, exited automatic mode, and/or modified a parameter of automatic mode. The notice may be audible, visual, and/or haptic. For example, an audible beep may be used. In an embodiment, an LCD panel is configured to display a visual notice.

In an embodiment, the user interface 3312 includes multiple buttons and an LED indicator. The multiple buttons are used to communicate commands to the system control device 150, and the LED indicator lights to indicate input of the commands.

The sensor communication interface 3306 is configured to communicate data such as sensor values with at least one sensor 141. The sensor communication interface 3306 communicates the data using any operable connection. An operable connection may be one in which signals, physical communications, and/or logical communications may be sent and/or received. An operable connection may include a physical interface, an electrical interface, and/or a data interface. The sensor communication interface 3306 provides for wireless communications in any now known or later developed format.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. Next one or more of the components may be paired with a separate device like a computer, tablet, or phone. This paired device may provide the user interface to allow the user to communicate with the components on the bicycle, for example the system control device 150. Examples of communication are updating firmware, setting variables, and running diagnostic tools and analysis.

In accordance with various embodiments of the present disclosure, the methods described herein may be implemented with software programs executable by a computer system, such as the system control device 150. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device 150 to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device 150 is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A torque sensor for a bicycle, the torque sensor comprising:

a support that is disposable around a clutch mechanism of the bicycle, such that the support and the clutch mechanism of the bicycle are separated by an air gap;

an excitation coil supported by the support; and a sense coil supported by the support at a distance away from the excitation coil in an axial direction of the support, wherein the excitation coil is configured to induce a voltage in the sense coil via the clutch mechanism of the bicycle when the support is disposed around the clutch mechanism of the bicycle, the induced voltage being related to a torque in the clutch mechanism.

2. The torque sensor of claim 1, further comprising a shield that covers the excitation coil and the sense coil.

3. The torque sensor of claim 2, further comprising a second sense coil, the shield also covering the second sense coil.

4. The torque sensor of claim 1, wherein the bicycle is an electric bicycle, and wherein the support is a hollow cylinder disposable around part of the clutch mechanism of the electric bicycle.

5. The torque sensor of claim 1, wherein the support includes a first groove and a second groove that extend circumferentially around an outer side of the support, the second groove being offset relative to the first groove along the axial direction of the support, and wherein the excitation coil is disposed within the first groove, and the sense coil is disposed within the second groove.

6. The torque sensor of claim 5, wherein the sense coil is a first sense coil, and the axial direction is a first axial direction, wherein the support further includes a third groove that extends circumferentially around the outer side of the support, the third groove being offset relative to the first groove along a second axial direction of the support, the second axial direction being opposite the first axial direction of the support, and wherein the torque sensor further comprises a second sense coil disposed around and supported by the support, the second sense coil being disposed within the third groove.

7. The torque sensor of claim 6, wherein the excitation coil is a first excitation coil, wherein the support further includes a fourth groove that extends circumferentially around the outer side of the support, the fourth groove being offset relative to the first groove along the first axial direction or the second axial direction, and wherein the torque sensor further comprises a second excitation coil disposed around and supported by the support, the second excitation coil being disposed within the fourth groove.

8. The torque sensor of claim 7, wherein the first excitation coil and the first sense coil form a first magnetic circuit, and the second excitation coil and the second sense coil form a second magnetic circuit, wherein the support has a first part that houses the first magnetic circuit, and a second part that houses the second magnetic circuit, wherein the torque sensor further comprises a shield that separates the first part of the support and the second part of the support, such that the first magnetic circuit and the second magnetic circuit are separated, and wherein the shield covers at least part of the support.

9. The torque sensor of claim 8, wherein the shield covers at least the first groove, the second groove, the third groove, and the fourth groove, and wherein the shield is made of a ferrite.

10. The torque sensor of claim 9, wherein the shield is a first shield, wherein the torque sensor further comprises a second shield that at least partially covers the first shield, and wherein the second shield is made of a non-ferromagnetic, electrically conductive material.

11. The torque sensor of claim 1, wherein the support is formed by a plurality of stacked printed circuit boards (PCBs), and wherein the excitation coil is formed on, in, or on and in a first printed circuit board (PCB) of the plurality of stacked PCBs, and the sense coil is formed on, in, or on and in a second PCB of the plurality of stacked PCBs.

12. The torque sensor of claim 1, wherein the first sensed coil overlaps with the clutch mechanism in the axial direction of the support.

13. A clutch mechanism for an electric bicycle, the clutch mechanism comprising:

an inner race;

an outer race rotatable positioned around the inner race; and a torque sensor positioned around a race of the inner race and the outer race, such that the torque sensor and the race are separated by an air gap, the torque sensor being configured to measure a torque within the clutch mechanism and comprising:

a housing that is disposable around the race;

an excitation coil disposed around and supported by the housing;

a first sense coil disposed around and supported by the housing at a first distance away from the excitation coil in a first axial direction of the housing; and a second sense coil disposed around and supported by the housing at a second distance away from the excitation coil in a second axial direction of the housing, the second axial direction of the housing being opposite the first axial direction of the housing, wherein the excitation coil is configured to induce a voltage in the first sense coil via the race, the induced voltage being related to a torque in the clutch mechanism.

14. The clutch mechanism of claim 13, wherein the race is the outer race, and the outer race is a shaft of a chainring of the electric bicycle.

15. The clutch mechanism of claim 13, wherein the excitation coil is a first excitation coil, wherein the torque sensor further comprises:

a second excitation coil disposed around and supported by the housing, the second excitation coil being offset relative to the first excitation coil in the second axial direction.

16. The clutch mechanism of claim 15, wherein the housing includes a first groove, a second groove, a third groove, and a fourth groove that extend circumferentially around an outer side of the housing, the first groove, the second groove, the third groove, and the fourth groove being offset relative to each other along the first axial direction of the housing, and wherein the first excitation coil is disposed within the first groove, the first sense coil is disposed within the second groove, the second sense coil is disposed within the third groove, and the second excitation coil is disposed within the fourth groove.

17. The clutch mechanism of claim 16, wherein the torque sensor further comprises a shield that separates the first excitation coil and the first sense coil from the second sense coil and the second excitation coil, and covers the first groove, the second groove, the third groove, and the fourth groove.

18. The clutch mechanism of claim 17, wherein the shield is a first shield and is made of a first material, and wherein the torque sensor further comprises a second shield, the second shield partially covering the first shield and being made of a second material, the second material being different than the first material.

19. The clutch mechanism of claim 18, wherein the voltage is a first voltage, wherein the second excitation coil is configured to induce a second voltage in the second sense coil via the race, and wherein the clutch mechanism further comprises a processor configured to determine the torque in the clutch mechanism based on the induced first volage and the induced second voltage.

20. The clutch mechanism of claim 19, wherein the processor is further configured to determine a difference between the induced first voltage and the induced second voltage, and wherein the processor being configured to determine the torque in the clutch mechanism based on the induced first voltage and the induced second voltage comprises the processor being configured to determine the torque in the clutch mechanism based on the determined difference between the induced first voltage and the induced second voltage.

21. The clutch mechanism of claim 13, wherein the first sensed coil overlaps with a clutch mechanism element in the axial direction of the support, the clutch mechanism element disposed between the inner race and outer race.

* * * * *